United States Patent
Higuchi

(10) Patent No.: US 10,307,911 B2
(45) Date of Patent: Jun. 4, 2019

(54) ROBOT

(71) Applicant: Panasonic Intellectual Property Management Co., Ltd., Osaka (JP)

(72) Inventor: Seiya Higuchi, Osaka (JP)

(73) Assignee: PANASONIC INTTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/051,639

(22) Filed: Aug. 1, 2018

(65) Prior Publication Data

US 2019/0061161 A1 Feb. 28, 2019

(30) Foreign Application Priority Data

Aug. 30, 2017 (JP) .................. 2017-166088

(51) Int. Cl.
  *B25J 9/16* (2006.01)
  *G05D 1/02* (2006.01)
  *G05D 1/08* (2006.01)

(52) U.S. Cl.
  CPC .......... *B25J 9/1697* (2013.01); *G05D 1/0231* (2013.01); *G05D 1/08* (2013.01); *G05D 1/0223* (2013.01); *G05D 1/0274* (2013.01)

(58) Field of Classification Search
  CPC .......... B25J 9/0003–1697; B25J 5/007; Y10S 901/01; G05D 1/0223; G05D 1/0231;
  (Continued)

(56) References Cited

U.S. PATENT DOCUMENTS 5,554,914 A * 9/1996 Miyazawa ............ B25J 5/00
  318/568.11
5,610,488 A * 3/1997 Miyazawa ............ B25J 5/00
  318/16

(Continued)

FOREIGN PATENT DOCUMENTS

JP 2016-212697 12/2016

OTHER PUBLICATIONS

Atsushi Koshiyama et al., "Development and Motion Control of the All-direction Steering-Type Mobile Robot (3rd Report, Principle, Control Methods and Experiments on Steering of the Robot)", The Japan Society of the Mechanical Engineers, Transactions of the Japan Society of Mechanical Engineers Series C58(548), Apr. 25, 1992, pp. 1146-1153 (With English Abstract).

*Primary Examiner* — Orlando Bousono
(74) *Attorney, Agent, or Firm* — Greenblum & Bernstein, P.L.C.

(57) ABSTRACT

A spherical shaped robot with a drive mechanism and a weight drive mechanism is provided. If a distance from the robot to an object is less than a predetermined value, the robot executes a pivot turn mode. In the pivot turn mode, the robot controls the drive mechanism to stop linear movements of the robot, controls the weight drive mechanism to tilt the weight to a first side representing one of the right hand side and left hand side of the robot, controls the drive mechanism to cause a forward movement of the robot with the weight tilted to the first side, controls the drive mechanism to stop the forward movement of the robot, controls the weight drive mechanism to tilt the weight to a second side different from the first side, and controls the drive mechanism to cause a backward movement of the robot with the weight tilted to the second side.

12 Claims, 15 Drawing Sheets

| PIVOT TURN BEHAVIORAL STATE | STATE OF ROBOT | CONTROL AMOUNT SET FOR WEIGHT DRIVE MECHANISM | CONTROL AMOUNT SET FOR SECOND DRIVE MECHANISM |
|---|---|---|---|
| 1 | DH Z-AXIS 151 | RIGHT ROTATION CONTROL AMOUNT | STOP CONTROL AMOUNT |
| 2 | DH Z-AXIS 152 | RIGHT ROTATION CONTROL AMOUNT | ACCELERATION CONTROL AMOUNT IN FORWARD DIRECTION |
| 3 | Z-AXIS DH 153 | LEFT ROTATION CONTROL AMOUNT | STOP CONTROL AMOUNT |
| 4 | Z-AXIS DH 154 | LEFT ROTATION CONTROL AMOUNT | ACCELERATION CONTROL AMOUNT IN BACKWARD DIRECTION |

US 10,307,911 B2

Page 2

(58) Field of Classification Search
CPC .. G05D 1/0255; G05D 1/0272; G05D 1/0274; G05D 1/08; G06N 3/008
See application file for complete search history.

(56) References Cited

U.S. PATENT DOCUMENTS

| | | | | |
|---|---|---|---|---|
| 5,929,585 A * | 7/1999 | Fujita | B62D 57/032 | 318/568.11 |
| 6,484,068 B1 * | 11/2002 | Yamamoto | B25J 19/0016 | 198/380 |
| 10,092,850 B1 * | 10/2018 | Smoot | A63H 29/22 | |
| 2001/0021882 A1 * | 9/2001 | Hosonuma | B25J 9/1674 | 700/245 |
| 2002/0081937 A1 * | 6/2002 | Yamada | A63H 3/48 | 446/175 |
| 2002/0193908 A1 * | 12/2002 | Parker | G06N 3/008 | 700/258 |
| 2002/0198626 A1 * | 12/2002 | Imai | G06N 3/008 | 700/245 |
| 2003/0004611 A1 * | 1/2003 | McKinney, Jr. | G06N 3/008 | 700/258 |
| 2003/0009261 A1 * | 1/2003 | Parker | G06N 3/008 | 700/258 |
| 2003/0049098 A1 * | 3/2003 | Parker | G06N 3/008 | 414/1 |
| 2003/0216835 A1 * | 11/2003 | Wakui | G05D 1/0272 | 700/245 |
| 2004/0017181 A1 * | 1/2004 | Sakai | H02J 7/0068 | 320/132 |
| 2004/0034449 A1 * | 2/2004 | Yokono | B25J 9/1633 | 700/245 |
| 2004/0059467 A1 * | 3/2004 | Lau | G06N 3/008 | 700/258 |
| 2004/0182614 A1 * | 9/2004 | Wakui | B25J 5/007 | 180/7.1 |
| 2004/0210344 A1 * | 10/2004 | Hara | B64C 33/025 | 700/245 |
| 2005/0049750 A1 * | 3/2005 | Parker | G06N 3/008 | 700/258 |
| 2005/0217061 A1 * | 10/2005 | Reindle | G05D 1/0227 | 15/319 |
| 2006/0013469 A1 * | 1/2006 | Wang | B25J 5/007 | 382/153 |
| 2006/0129278 A1 * | 6/2006 | Sugiyama | B25J 13/085 | 700/245 |
| 2006/0158146 A1 * | 7/2006 | Tadano | B25J 15/0004 | 318/568.21 |
| 2007/0050087 A1 * | 3/2007 | Ishihara | G06F 3/0346 | 700/245 |
| 2007/0150105 A1 * | 6/2007 | Orita | B62D 57/032 | 700/245 |
| 2007/0164748 A1 * | 7/2007 | Ishihara | H04R 5/02 | 324/457 |
| 2007/0192910 A1 * | 8/2007 | Vu | B25J 5/007 | 700/245 |
| 2007/0198128 A1 * | 8/2007 | Ziegler | B25J 5/007 | 700/245 |
| 2007/0199108 A1 * | 8/2007 | Angle | B25J 5/007 | 318/568.12 |
| 2007/0257990 A1 * | 11/2007 | Hayashi | H04N 5/23203 | 348/211.99 |
| 2007/0270074 A1 * | 11/2007 | Aochi | A63H 11/00 | 446/175 |
| 2008/0075561 A1 * | 3/2008 | Takemura | F16F 1/025 | 414/2 |
| 2008/0084175 A1 * | 4/2008 | Hollis | B25J 5/007 | 318/568.12 |
| 2008/0097644 A1 * | 4/2008 | Kaznov | A63H 11/00 | 700/245 |
| 2009/0059033 A1 * | 3/2009 | Shimada | B25J 19/022 | 348/229.1 |
| 2009/0118865 A1 * | 5/2009 | Egawa | B25J 19/023 | 700/259 |
| 2009/0177323 A1 * | 7/2009 | Ziegler | B25J 5/007 | 700/259 |
| 2009/0254216 A1 * | 10/2009 | Matsushima | B25J 9/1671 | 700/246 |
| 2010/0073490 A1 * | 3/2010 | Wang | B25J 5/007 | 348/207.11 |
| 2011/0077776 A1 * | 3/2011 | Matsushima | B62D 57/032 | 700/264 |
| 2011/0172822 A1 * | 7/2011 | Ziegler | B25J 5/007 | 700/259 |
| 2011/0288684 A1 * | 11/2011 | Farlow | B25J 11/009 | 700/264 |
| 2012/0061155 A1 * | 3/2012 | Berger | B25J 5/007 | 180/21 |
| 2012/0182392 A1 * | 7/2012 | Kearns | B25J 11/009 | 348/46 |
| 2012/0185094 A1 * | 7/2012 | Rosenstein | B25J 11/009 | 700/259 |
| 2012/0185095 A1 * | 7/2012 | Rosenstein | B25J 5/007 | 700/259 |
| 2012/0185096 A1 * | 7/2012 | Rosenstein | B25J 11/009 | 700/259 |
| 2012/0215355 A1 * | 8/2012 | Bewley | B25J 5/005 | 700/258 |
| 2013/0155221 A1 * | 6/2013 | Wang | B25J 5/007 | 348/114 |
| 2013/0226344 A1 * | 8/2013 | Wong | G05D 1/024 | 700/258 |
| 2014/0005827 A1 * | 1/2014 | Ogawa | B25J 9/1674 | 700/250 |
| 2014/0031983 A1 * | 1/2014 | Low | B25J 9/0087 | 700/257 |
| 2014/0039680 A1 * | 2/2014 | Angle | B25J 5/007 | 700/259 |
| 2014/0060224 A1 * | 3/2014 | Amino | B25J 17/00 | 74/89 |
| 2014/0060233 A1 * | 3/2014 | Gomi | B25J 9/1638 | 74/490.05 |
| 2014/0067118 A1 * | 3/2014 | Gomi | B25J 9/1651 | 700/253 |
| 2014/0200713 A1 * | 7/2014 | Allen | B25J 11/009 | 700/253 |
| 2014/0214204 A1 * | 7/2014 | Toshimitsu | G05B 19/19 | 700/253 |
| 2014/0251702 A1 * | 9/2014 | Berger | B25J 5/007 | 180/21 |
| 2015/0019013 A1 * | 1/2015 | Rose | G01L 1/16 | 700/258 |
| 2015/0073598 A1 * | 3/2015 | Rosenstein | B25J 5/007 | 700/264 |
| 2015/0073646 A1 * | 3/2015 | Rosenstein | B25J 11/009 | 701/28 |
| 2015/0127141 A1 * | 5/2015 | Kawada | B25J 9/0087 | 700/206 |
| 2015/0127147 A1 * | 5/2015 | Yamazaki | B25J 13/088 | 700/248 |
| 2015/0142169 A1 * | 5/2015 | Kim | A47L 11/282 | 700/245 |
| 2015/0150429 A1 * | 6/2015 | Yoo | A47L 11/4011 | 173/1 |
| 2015/0158182 A1 * | 6/2015 | Farlow | B25J 11/009 | 700/259 |
| 2015/0202769 A1 * | 7/2015 | Bewley | B25J 5/005 | 700/258 |
| 2015/0266185 A1 * | 9/2015 | Sekine | B25J 13/088 | 74/490.01 |
| 2015/0336264 A1 * | 11/2015 | Berger | B25J 5/007 | 180/21 |
| 2016/0083025 A1 * | 3/2016 | Gettings | B62D 55/075 | 180/9.32 |
| 2016/0089775 A1 * | 3/2016 | Yamazaki | B25J 9/0009 | 318/568.11 |
| 2016/0101521 A1 * | 4/2016 | Gomi | B25J 9/1638 | 74/490.01 |
| 2016/0161937 A1 * | 6/2016 | Toshimitsu | G05B 19/19 | 700/253 |

(56) References Cited

U.S. PATENT DOCUMENTS

| | | | |
|---|---|---|---|
| 2016/0161948 A1* | 6/2016 | Wang | B25J 5/007 |
| | | | 700/264 |
| 2016/0176047 A1* | 6/2016 | Gomi | B25J 9/1651 |
| | | | 700/253 |
| 2016/0229052 A1* | 8/2016 | Touma | B25J 13/06 |
| 2016/0241762 A1* | 8/2016 | Ono | H04N 5/2257 |
| 2016/0259347 A1* | 9/2016 | Yamaguchi | B66C 13/40 |
| 2016/0316982 A1* | 11/2016 | Kim | A47L 9/2857 |
| 2017/0028554 A1* | 2/2017 | Gomi | B25J 9/1651 |
| 2018/0043838 A1* | 2/2018 | Ellerman | B62D 39/00 |
| 2018/0043952 A1* | 2/2018 | Ellerman | B60K 1/00 |
| 2018/0070788 A1* | 3/2018 | Senoo | A47L 5/22 |
| 2018/0071909 A1* | 3/2018 | Bewley | B25J 5/005 |

* cited by examiner

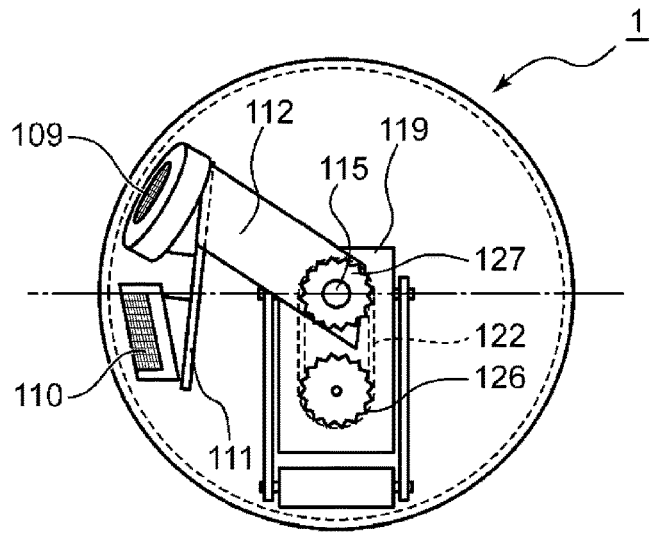
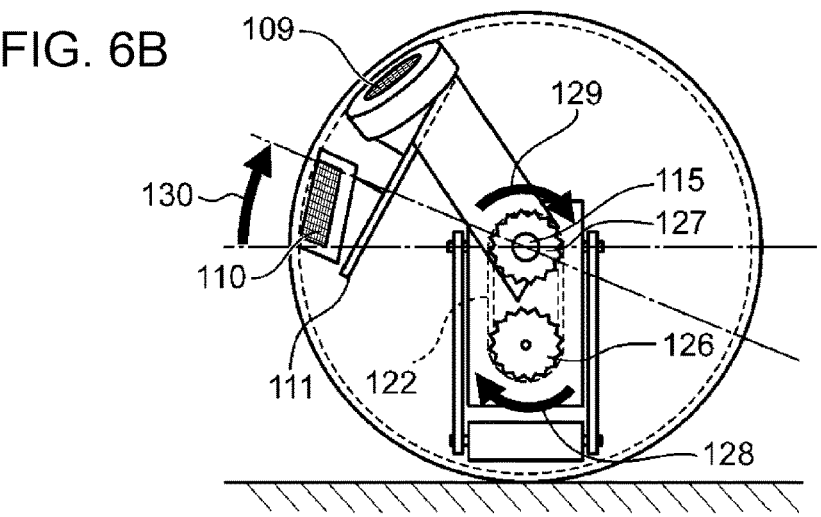
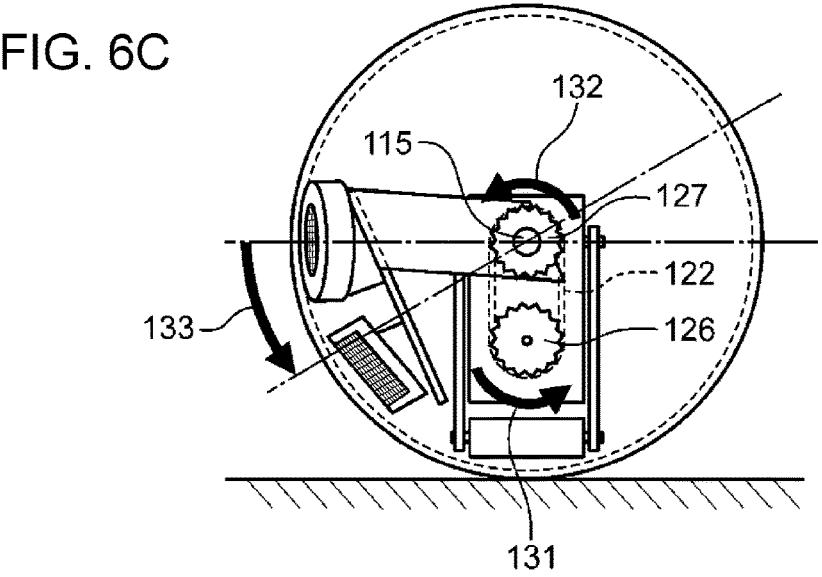

FIG. 12

| PIVOT TURN BEHAVIORAL STATE | STATE OF ROBOT | CONTROL AMOUNT SET FOR WEIGHT DRIVE MECHANISM | CONTROL AMOUNT SET FOR SECOND DRIVE MECHANISM |
|---|---|---|---|
| 1 | 151 | RIGHT ROTATION CONTROL AMOUNT | STOP CONTROL AMOUNT |
| 2 | 152 | RIGHT ROTATION CONTROL AMOUNT | ACCELERATION CONTROL AMOUNT IN FORWARD DIRECTION |
| 3 | 153 | LEFT ROTATION CONTROL AMOUNT | STOP CONTROL AMOUNT |
| 4 | 154 | LEFT ROTATION CONTROL AMOUNT | ACCELERATION CONTROL AMOUNT IN BACKWARD DIRECTION |

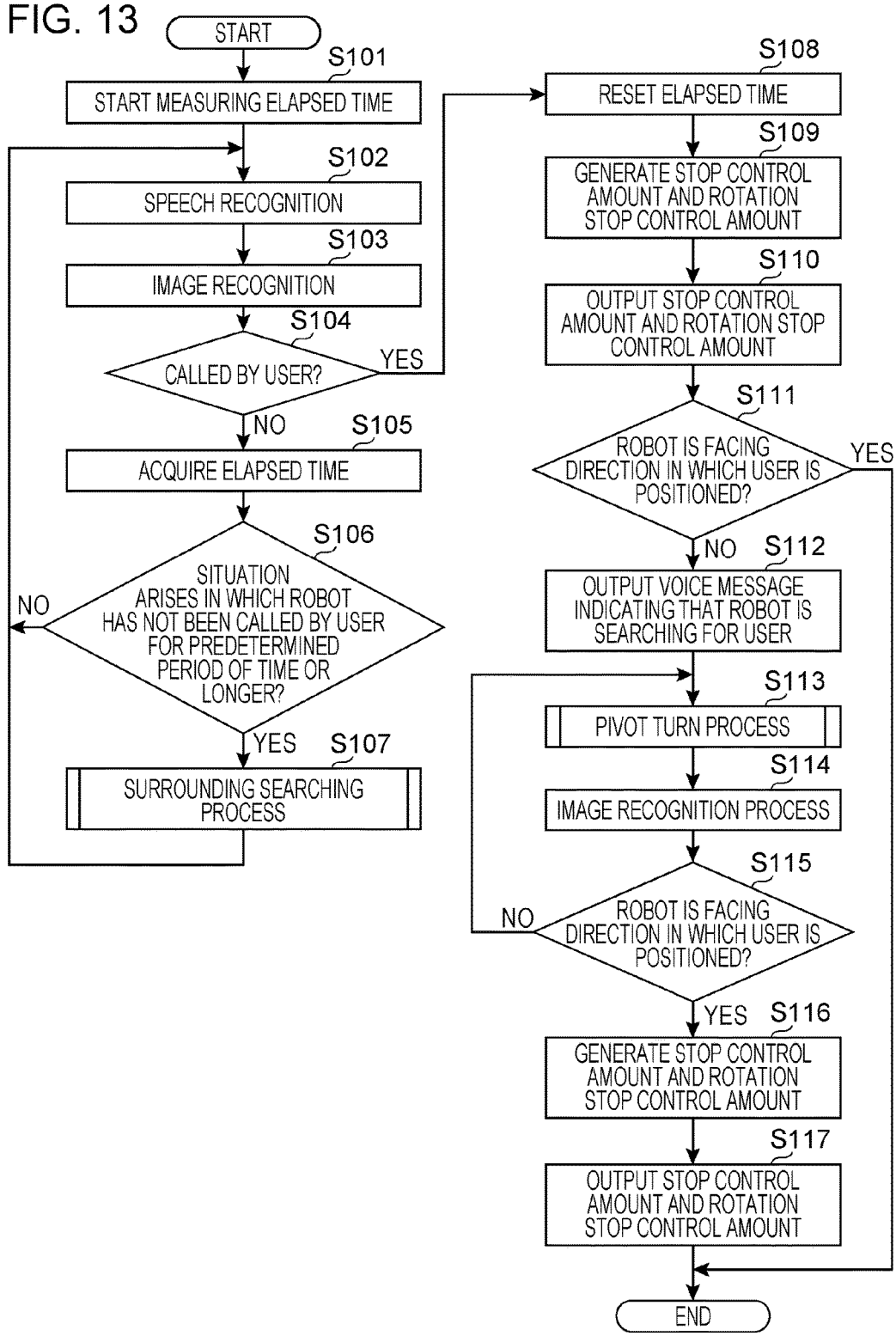

ROBOT

BACKGROUND

1. Technical Field

The present disclosure relates to a robot.

2. Description of the Related Art

For the purpose of bringing the round-trip travel distance closer to a target value, Japanese Unexamined Patent Application Publication No. 2016-212697 describes the following technology. That is, according to Japanese Unexamined Patent Application Publication No. 2016-212697, to change the travel direction of a travel device by 180 degrees, the center of gravity position of the traveling device is set at a position in the rear section of the travel device, and the travel device is turned 90 degrees clockwise by a pivot turn first. Subsequently, the center of gravity position of the traveling device is set at a position in the front section of the travel device, and the travel device is turned 90 degrees clockwise by a pivot turn.

SUMMARY

However, the above-mentioned existing technique requires further improvement.

In one general aspect, the techniques disclosed here feature a robot including a spherical band-shaped main casing generated by cutting off a first side portion and a second side portion facing the first side portion out of a spherical body, a first spherical cap portion corresponding to the first side portion, a second spherical cap portion corresponding to the second side portion, a shaft that joins the first spherical cap portion to the second spherical cap portion, a display portion that is attached to the shaft via an arm and that displays at least part of a face of the robot, a weight that is provided inside the main casing and that rotates around a shaft of the weight perpendicular to the shaft, a first drive mechanism that rotates the first spherical cap portion and the second spherical cap portion by rotation of the shaft, a second drive mechanism independent from the first drive mechanism, where the second drive mechanism rotates the main casing about the shaft, a weight drive mechanism that rotates the shaft of the weight, a range finding sensor disposed in one of the first spherical cap portion and the second spherical cap portion so as to be facing the same side as the display portion, and a control circuit. The control circuit determines whether a distance from the range finding sensor to an object in front is less than a first predetermined value. If the distance is less than the first predetermined value, the control circuit executes a pivot turn mode. In the pivot turn mode, the control circuit causes the robot to turn with a first turning radius by controlling the second drive mechanism to stop forward movement and backward movement of the robot, controlling the weight drive mechanism to tilt the weight to a first side that is one of a right hand side and a left hand side as viewed in a direction in which the display portion is facing, controlling the second drive mechanism to move the robot forward with the weight tilted to the first side, controlling the second drive mechanism to stop the forward movement and the backward movement of the robot, controlling the weight drive mechanism to tilt the weight to a second side different from the first side as viewed in the direction in which the display portion is facing, and controlling the second drive mechanism to move the robot backward with the weight tilted to the second side.

According to the present disclosure, the above-mentioned existing techniques can be further improved.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is an internal side view of the robot as viewed in direction VIA, VIB, VIC in FIG. 3;

FIG. 6B is an internal side view of the robot having a first display portion, a second display portion, and a third display portion which are tilted upward as viewed in direction VIA, VIB, VIC in FIG. 3, according to the embodiment of the present disclosure;

FIG. 6C is an internal side view of the robot having the first display portion, the second display portion, and the third display portion which are tilted downward as viewed in direction VIA, VIB, VIC in FIG. 3, according to the embodiment of the present disclosure;

FIG. 12 illustrates the state of the robot when a pivot turn process is performed;

FIG. 13 is a flowchart of a process performed by the robot according to the embodiment of the present disclosure;

DETAILED DESCRIPTION

Figure 1A:
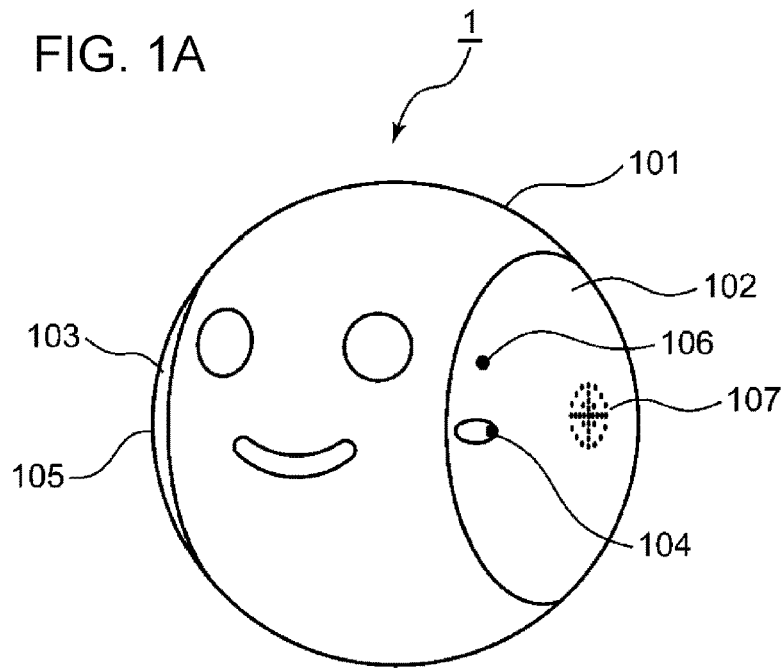
FIG. 1A is an external perspective view of a robot according to an embodiment of the present disclosure.

Underlying Knowledge Forming Basis of the Present Disclosure

The inventor has studied a spherical robot that has a spherical shell and that autonomously moves inside a room, such as a room in a house, by rolling the spherical shell.

The spherical robot that the present inventor has studied includes a pair of spherical cap portions, a shaft that joins the two spherical cap portions to each other, a display portion attached to the shaft, a main casing rotatably mounted on the shaft for rotation. The spherical robot is configured to travel on the ground by rotating the main casing about the shaft. In addition, the spherical robot includes a weight that is tiltable (swingable) to the right and left around a weight shaft which extends in the direction of forward movement (the direction perpendicular to the shaft). If the main casing is rotated with the weight tiled to the left, the robot turns to the left. In contrast, if the main casing is rotated with the weight tiled to the right, the robot turns to the right. Hereinafter, such a turn is referred to as a "normal turn".

However, the turning radius of a normal turn is large. As a result, if the robot attempts to make a normal turn to change the direction thereof in a turning space such as a space near a wall, it is difficult for the robot to change the direction thereof.

To reduce the turning radius, a pivot turn described in Japanese Unexamined Patent Application Publication No. 2016-212697 may be employed. However, the pivot turn is a turn made by rotating a pair of wheels in opposite directions. In contrast, since the spherical robot studied by the present inventor travels by rotating the main casing, the spherical robot has only one member corresponding to a wheel. As a result, according to the present disclosure, the technique disclosed in Japanese Unexamined Patent Application Publication No. 2016-212697 cannot be applied.

The present disclosure provides a robot capable of making a turn even in a place where the turning space is limited.

(1) According to an aspect of the present disclosure, a robot includes a spherical band-shaped main casing generated by cutting off a first side portion and a second side portion facing the first side portion out of a spherical body, a first spherical cap portion corresponding to the first side portion, a second spherical cap portion corresponding to the second side portion, a shaft that joins the first spherical cap portion to the second spherical cap portion, a display portion that is attached to the shaft via an arm and that displays at least part of a face of the robot, a weight that is provided inside the main casing and that rotates around a shaft of the weight perpendicular to the shaft, a first drive mechanism that rotates the first spherical cap portion and the second spherical cap portion by rotation of the shaft, a second drive mechanism independent from the first drive mechanism, where the second drive mechanism rotates the main casing about the shaft, a weight drive mechanism that rotates the shaft of the weight, a range finding sensor disposed in one of the first spherical cap portion and the second spherical cap portion so as to be facing the same side as the display portion, and a control circuit. The control circuit determines whether a distance from the range finding sensor to an object in front is less than a first predetermined value. If the distance is less than the first predetermined value, the control circuit executes a pivot turn mode. In the pivot turn mode, the control circuit causes the robot to turn with a first turning radius by controlling the second drive mechanism to stop forward movement and backward movement of the robot, controlling the weight drive mechanism to tilt the weight to a first side that is one of a right hand side and a left hand side as viewed in a direction in which the display portion is facing, controlling the second drive mechanism to move the robot forward with the weight tilted to the first side, controlling the second drive mechanism to stop the forward movement and the backward movement of the robot, controlling the weight drive mechanism to tilt the weight to a second side different from the first side as viewed in the direction in which the display portion is facing, and controlling the second drive mechanism to move the robot backward with the weight tilted to the second side.

According to the present aspect, if the distance from the range finding sensor to the object in front is less than the first predetermined value, the pivot turn mode is executed. In the pivot turn mode, after the forward and backward movements of the robot are stopped, the robot is moved forward with the weight tilted to the first side as viewed in the direction in which the display portion is facing. After the forward movement of the robot is started, the forward and backward movements of the robot are stopped. Thereafter, the robot is moved backward with the weight tilted to the second side different from the first side as viewed in the direction in which the display portion is facing. In this manner, according to the present aspect, the robot can be turned through a set of the forward turn to the first side and the backward turn to the second side. Thus, the robot can be turned with a turning radius that is smaller than in a normal turn. As a result, according to the present aspect, the robot can be turned in a place where the turning space is limited, such as a place near walls where one of the walls is in the front vicinity of the robot and the other wall is in the right or left vicinity of the robot.

(2) According to the above aspect, if the distance from the range finding sensor to an object in front measured by the range finding sensor is greater than or equal to the first predetermined value, the control circuit may determine whether the distance is less than a second predetermined value that is greater than the first predetermined value. If the control circuit determines that the distance is less than the second predetermined value, the control circuit may cause the robot to turn with a second turning radius larger than the first turning radius by controlling the second drive mechanism to reduce a first speed at which the robot moves forward to a second speed lower than the first speed and controlling the weight drive mechanism to tilt the weight to the first side as viewed in the direction in which the display portion is facing.

According to the present aspect, if the distance from the range finding sensor to the object in front is greater than or equal to the first predetermined value, the speed of the robot is reduced to the second speed that is lower than the first speed at which the robot normally moves forward and, in addition, the robot is caused to make a normal turn with the weight tilted to the first side. Thus, the robot can continue to travel while avoiding collision with the object in front. In addition, since the robot makes a normal turn at a second speed that is lower than the first speed at which the robot moves forward, the centrifugal force acting on the robot is reduced and, thus, the robot can turn safely.

(3) According to the above aspect, if the distance from the range finding sensor to an object in front measured by the range finding sensor is greater than or equal to the first predetermined value, the control circuit may determine whether the distance is less than the second predetermined value that is greater than the first predetermined value. If the control circuit determines that the distance is greater than or equal to the second predetermined value, the control circuit may control the second drive mechanism to move the robot forward at the first speed.

According to the present aspect, if the distance from the range finding sensor to the object in front is greater than or equal to the second predetermined value greater than the first predetermined value, the robot moves forward at the first speed. As a result, when the distance from the range finding sensor to the object in front is large and, thus, the robot is not likely to collide with the object, the robot is allowed to move forward at the first speed.

(4) According to the above aspect, in moving the robot forward at the first speed, the control circuit may cause the robot to travel in a zigzag line by controlling the weight drive mechanism to tilt the weight to the right and left as viewed in the direction in which the display portion is facing.

According to the present aspect, since the robot moves forward in a zigzag line at the first speed, the robot can behave like a live pet, as compared with the case in which the robot simply moves forward in a straight line.

(5) According to the above aspect, the robot may further include a timer and a microphone that acquires a sound signal from surroundings of the robot. The control circuit may determine whether a voice sound emitted by a user of the robot to call the robot is included in a first sound signal acquired from when the timer starts measuring the time. If the control circuit determines that the voice sound is not included in the first sound signal for a predetermined period of time or longer from start of time measurement of the timer, the control circuit may execute a surroundings search mode in which the robot moves regardless of whether the control circuit has received, from the user, an instruction for the robot.

According to the present aspect, if the user does not emit voice sound to call the robot before the predetermined time elapses from start of time measurement of the timer, the peripheral search mode in which the robot moves regardless of whether the control circuit has received, from the user, an instruction is executed. Consequently, the robot can move autonomously even in a scene where the user does not play with the robot. In this manner, the robot can behave like a pet.

(6) According to the above aspect, the robot may further include a camera that captures an image of the surroundings of the robot and a loudspeaker that emits a sound signal. The camera may be disposed in one of the first spherical cap portion and the second spherical cap portion. If the control circuit determines that a voice sound emitted by the user to call the robot is included in the first sound signal acquired until the predetermined period of time elapses from start of time measurement of the timer, the control circuit may determine whether an image of the user is included in the captured image. If the control circuit determines that the image of the user is not included in the captured image, the control circuit may execute the pivot turn mode until the control circuit determines that the image of the user is included in the captured image.

According to the present aspect, when the user emits voice sound to call the robot before the predetermined time elapses from start of time measurement of the timer and if the image of the user is not included in the image captured by the camera, the pivot turn is made by the robot so that the front of the robot is oriented in the direction in which the user is positioned. In this manner, the robot can behave as if it responds to the voice sound of the user.

(7) According to the above aspect, after executing the surroundings search mode, the control circuit may determine whether a voice sound emitted by the user of the robot to call the robot is included in a second sound signal acquired by the microphone until the predetermined period of time elapses. If the control circuit determines that the voice sound is not included in the second sound signal, the control circuit may continue to execute the surroundings search mode.

According to the present aspect, after the surroundings search mode is executed, if the user does not emit voice sound to call the robot within a predetermined period of time, the surroundings search mode continues. As a result, the robot is prevented from stop moving after the surroundings search mode ends.

(8) According to the above aspect, the control circuit may control the second drive mechanism to stop the forward movement and the backward movement of the robot in accordance with a stop control amount for stopping the rotation of the main casing, control the weight drive mechanism to tilt the weight to the first side in accordance with a first rotation control amount, control the second drive mechanism to move the robot forward in accordance with a first acceleration control amount for rotating the main casing with the weight tilted to the first side, control the second drive mechanism to stop the forward movement and the backward movement of the robot, control the weight drive mechanism to tilt the weight to the second side as viewed in the direction in which the display portion is facing in accordance with a second rotation control amount that is a control amount in a direction opposite to the direction of the first rotation control amount, and control the second drive mechanism to move the robot backward with the weight tilted to the second side in accordance with a second acceleration control amount having the same control amount as the first acceleration control amount.

The present aspect is an example of control performed on the robot to cause the robot to execute a pivot turn mode.

(9) According to the above aspect, the control circuit may control the second drive mechanism to move the robot forward in accordance with a deceleration control amount for moving the robot forward at the second speed and control the weight drive mechanism to tilt the weight to the first side in accordance with a first rotation control amount.

The present aspect is an example of control performed on the robot to cause the robot to make a normal turn.

(10) According to the above aspect, the control circuit may control the second drive mechanism to move the robot forward at the first speed in accordance with a constant-speed control amount for moving the robot forward at the first speed.

The present aspect is an example of control performed on the robot to move the robot forward.

(11) In the above aspect, the control circuit may control the weight drive mechanism to tilt the weight to the right and left as viewed in the direction in which the display portion is facing in accordance with a first rotation control amount and a second rotation control amount that is a control amount in a direction opposite to the direction of the first rotation control amount.

The present aspect is an example of control performed on the robot that tilts the weight to the right or left around the shaft of the weight.

(12) According to the above aspect, if the control circuit determines that the captured image includes the image of the user, the control circuit may control the weight drive mechanism to stop the weight at an initial position in accordance with a rotation stop control amount.

The present aspect is an example of control performed on the robot that returns the weight tilted to the right or left around the shaft of the weight to the initial position.

Embodiments

Embodiments of the present disclosure are described below with reference to the accompanying drawings. Note that the same reference numerals are used throughout the drawings to designate the same or similar constituent elements.

Overall Configuration

Figure 1B:
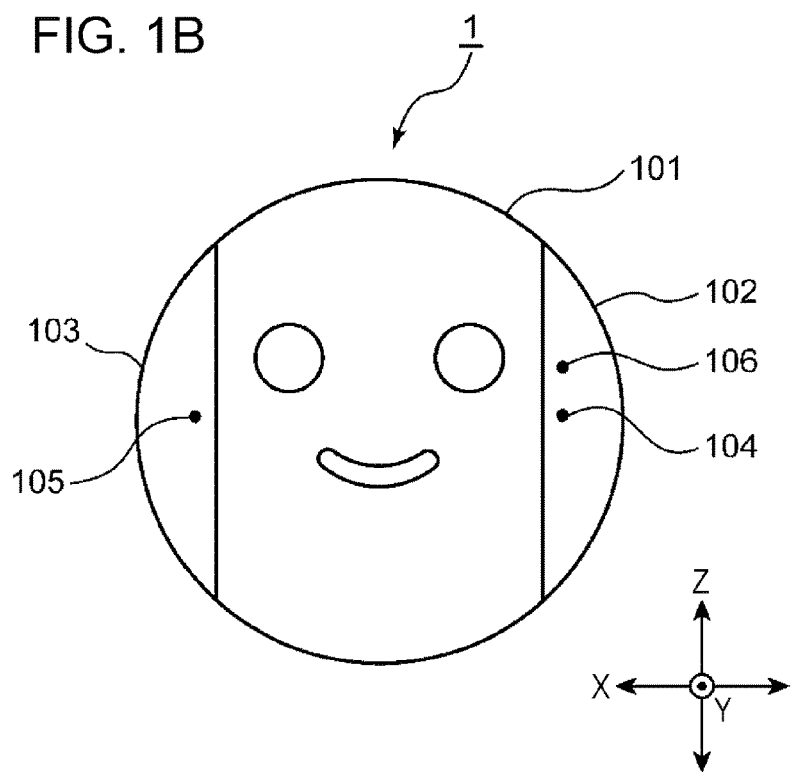
FIG. 1B is an external front view of the robot according to the embodiment of the present disclosure.

FIG. 1A is an external perspective view of a robot 1 according to an embodiment of the present disclosure. FIG. 1B is an external front view of the robot 1 according to the embodiment of the present disclosure. As illustrated in FIGS. 1A and 1B, the robot 1 includes a spherical band-shaped main casing 101, a first spherical cap portion 102, and a second spherical cap portion 103. The main casing 101, the first spherical cap portion 102, and the second spherical cap portion 103 together constitute a spherical body. That is, the robot 1 has a spherical shape. In addition, as illustrated in FIG. 1A, the robot 1 includes a camera 104 in the first spherical cap portion 102 and a range finding sensor 105 in the second spherical cap portion 103. The camera 104 is mounted in the first spherical cap portion 102 such that the optical axis is oriented, for example, in the frontward direction of the robot 1. The camera 104 captures the image of the surroundings of the robot 1. The range finding sensor 105 is attached to the second spherical cap portion 103 such that the optical axis is oriented, for example, in the frontward direction of the robot 1. The range finding sensor 105 acquires the distance information from the range finding sensor 105 to an object located in front of the robot 1.

In addition, as illustrated in FIG. 1A, the robot 1 includes a microphone 106 and a loudspeaker 107 in the first spherical cap portion 102. The microphone 106 acquires a sound signal from the surroundings of the robot 1. The loudspeaker 107 outputs the voice information of the robot 1. Note that according to the present embodiment, the robot 1 includes the camera 104 in the first spherical cap portion 102 and includes the range finding sensor 105 in the second spherical cap portion 103. However, the configuration of the robot 1 is not limited thereto. The camera 104 and the range finding sensor 105 can be included in at least one of the first spherical cap portion 102 and the second spherical cap portion 103. While the present embodiment is described with reference to the robot 1 including the microphone 106 and the loudspeaker 107 in the first spherical cap portion 102, the configuration of the robot 1 is not limited thereto. At least one of the first spherical cap portion 102 and the second spherical cap portion 103 can include the microphone 106 and the loudspeaker 107.

Figure 2:
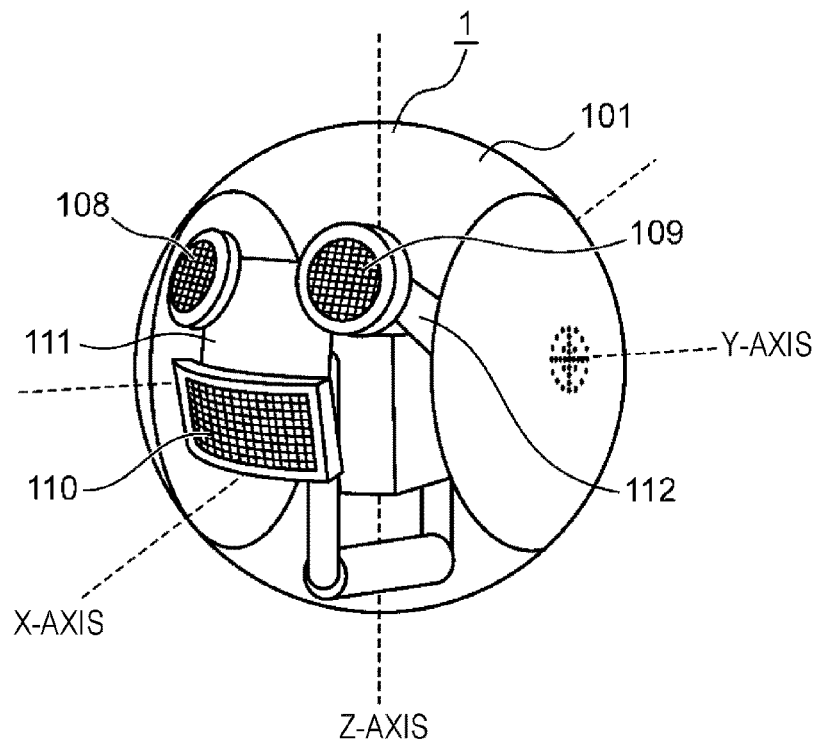
FIG. 2 is an internal perspective view of the robot according to the embodiment of the present disclosure.
Figure 3:
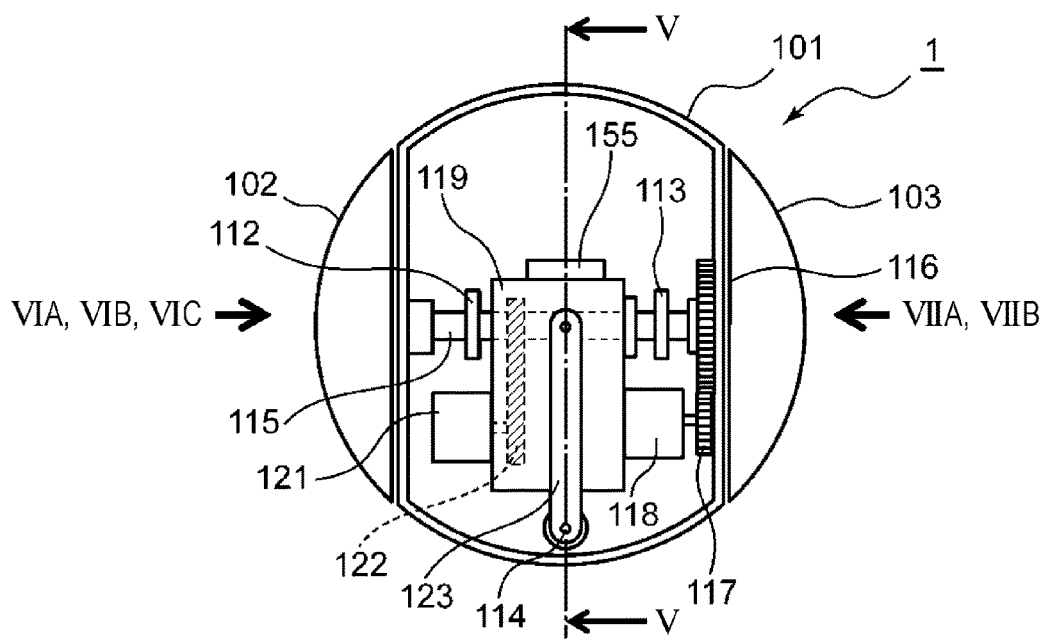
FIG. 3 is an internal rear view of the robot 1 according to the embodiment of the present disclosure.

FIG. 2 is an internal perspective view of the robot 1 according to the embodiment of the present disclosure. As illustrated in FIG. 2, the robot 1 includes a first display portion 108, a second display portion 109, and a third display portion 110 inside a main casing 101. The first display portion 108, the second display portion 109, and the third display portion 110 are provided on a fixed sheet metal plate 111. The fixed sheet metal plate 111 is attached to a shaft 115 (refer to FIG. 3) via a first arm 112 and a second arm 113. FIG. 3 is an internal rear view of the robot 1 according to the embodiment of the present disclosure. As illustrated in FIG. 3, the first arm 112 and the second arm 113 are attached to the shaft 115 so as to extend from the shaft 115 to the front of the robot 1 in a direction perpendicular to the shaft 115. For example, the first display portion 108, the second display portion 109, and the third display portion 110 are formed from a plurality of light emitting diodes. The first display portion 108, the second display portion 109, and the third display portion 110 display information regarding the facial feedback from the robot 1. More specifically, as illustrated in FIGS. 1A and 1B, the first display portion 108, the second display portion 109, and the third display portion 110 display parts of the face of the robot 1 (for example, the eyes and the mouth) by individually controlling the lighting of the plurality of light emitting diodes. In the example illustrated in FIG. 2, the first display portion 108 displays the image of the left eye when the robot 1 is viewed from the front, the second display portion 109 displays the image of the right eye when the robot 1 is viewed from the front, and the third display portion 110 displays an image of the mouth. The optical images of the left eye, the right eye, and the mouth are transmitted through the main casing 101 made of a transparent or translucent member and are emitted to the outside.

Note that the first arm 112 and the second arm 113 are attached to the shaft 115 so as to extend to the front surface of the robot 1. Accordingly, the direction in which the first display portion 108 and the second display portion 109 are oriented, that is, the direction in which the display portion is facing corresponds to the frontward direction.

As illustrated in FIG. 3, the robot 1 includes a weight 114 in the lower section of the interior of the main casing 101. Therefore, the center of gravity of the robot 1 is positioned below the center of the main casing 101. Thus, the operation performed by the robot 1 can be stabilized. FIG. 3 also illustrates a first drive mechanism 203 (refer to FIG. 11) for rotating the shaft 115, a second drive mechanism 204 (refer to FIG. 11) for rotating the main casing 101, and a weight drive mechanism 205 (refer to FIG. 11) for moving the center of gravity of the robot 1.

Figure 4:
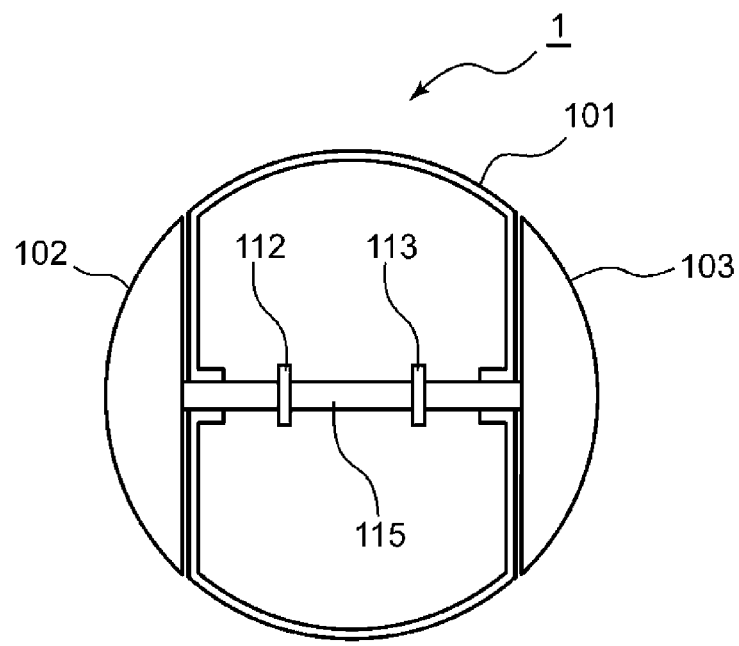
FIG. 4 is an internal rear view illustrating a first spherical cap portion and a second spherical cap portion of the robot joined to each other according to the embodiment of the present disclosure.

In FIG. 3, the shaft 115 is located at the center of the robot 1 and serves as the central axis of the robot 1. FIG. 4 is an internal rear view illustrating the first spherical cap portion 102 and the second spherical cap portion 103 of the robot 1 joined to each other according to the embodiment of the present disclosure. In FIG. 4, the first spherical cap portion 102 and the second spherical cap portion 103 are joined to each other by the shaft 115. Note that the shaft 115 is not fixed to the main casing 101. Accordingly, when the shaft 115 is rotated, the first spherical cap portion 102 and the second spherical cap portion 103 connected to the shaft 115 rotate in synchronization with the shaft 115. However, at this time, the main casing 101 does not rotate.

As illustrated in FIG. 3, the second drive mechanism 204 (refer to FIG. 11) includes a first gear 116 fixed to the main casing 101, a second gear 117 meshing with the first gear 116, a first motor 118 connected to the second gear 117, and a frame 119 for fixing the first motor 118. The frame 119 is suspended from the shaft 115. Consequently, even when the shaft 115 rotates, the frame 119 does not rotate. In addition, the frame 119 includes a gyro sensor 155 that detects the rotation amount of the frame 119. According to the present embodiment, the center of the first gear 116 coincides with the center of the shaft 115. The operation performed by the second drive mechanism 204 (refer to FIG. 11) is described in detail below.

Figure 5:
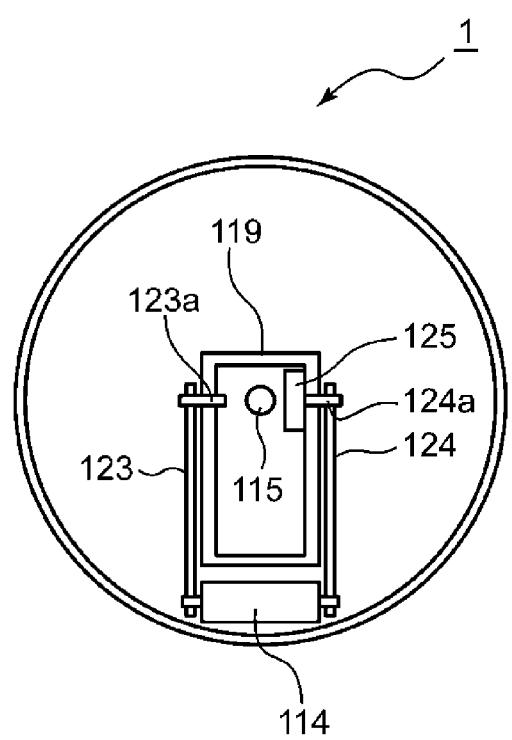
FIG. 5 is a cross-sectional view of the robot taken along line V-V in FIG. 3.

The weight drive mechanism 205 (refer to FIG. 11) is described below with reference to FIGS. 3 and 5. FIG. 5 is a cross-sectional view of the robot 1 taken along line V-V in FIG. 3. The V-V cross section is a plane orthogonal to the view in direction VIA, VIB, VIC (or the view in direction VIIA, VIIB) and is a cross section obtained when the robot 1 is cut with a plane which passes through the center of the robot 1.

As illustrated in FIGS. 3 and 5, the weight drive mechanism 205 (refer to FIG. 11) includes a third arm 123 that supports one end of the weight 114, a fourth arm 124 that supports the other end of the weight 114, and a third motor 125 connected to the fourth arm 124. According to the present embodiment, the weight drive mechanism 205 (refer to FIG. 11) is attached for free rotation to the frame 119. Thus, even when the third motor 125 is driven, the frame 119 does not rotate together with the third motor 125 being driven.

More specifically, the third arm 123 has a weight shaft 123a attached to its upper end. The third arm 123 is attached for free rotation to the frame 119 via the weight shaft 123a. The fourth arm 124 has a weight shaft 124a attached to its upper end. The fourth arm 124 is attached for free rotation to the frame 119 via the weight shaft 124a.

The weight shaft 123a and the weight shaft 124a are attached to the frame 119 in a straight line so as to be orthogonal to the vertical plane passing through the shaft 115.

More specifically, one end of the weight shaft 123a adjacent to the shaft 115 is inserted for free rotation into a hole formed in the frame 119. One end of the weight shaft 124a adjacent to the shaft 115 is inserted for free rotation into a hole formed in the frame 119 and is connected to the third motor 125. The weight 114 is cylindrical, for example, and is sandwiched between the lower end of the third arm 123 and the lower end of the fourth arm 124 such that the length direction thereof is parallel to the weight shaft 123a and the weight shaft 124a. In this manner, the weight 114 is attached to the frame 119 so as to be rotatable around the weight shafts 123a and 124a, that is, around the roll axis. The operation performed by the weight drive mechanism 205 (refer to FIG. 11) is described in detail below.

The first drive mechanism 203 (refer to FIG. 11) is described below with reference to FIGS. 3 and 6A. FIG. 6A is an internal side view of the robot 1 as viewed in direction VIA, VIB, VIC in FIG. 3. The view in direction VIA, VIB, VIC is the left side view of the robot 1, where the term "left" refers to the left of an observer viewing the robot 1 from the back to the front of the robot 1. In addition, the view in direction VIIA, VIIB is the right side view of the robot 1, where the term "right" is the right of an observer viewing the robot 1 from the back to the front of the robot 1. As illustrated in FIGS. 3 and 6A, the first drive mechanism 203 (refer to FIG. 11) includes a drive belt 122 that synchronizes a second motor 121 fixed to the frame 119, a third gear 126 connected to the second motor 121, and a fourth gear 127 fixed to the third gear 126 and the shaft 115 with one another.

The operation performed by the first drive mechanism 203 (refer to FIG. 11) is described in detail below.

Figure 11:
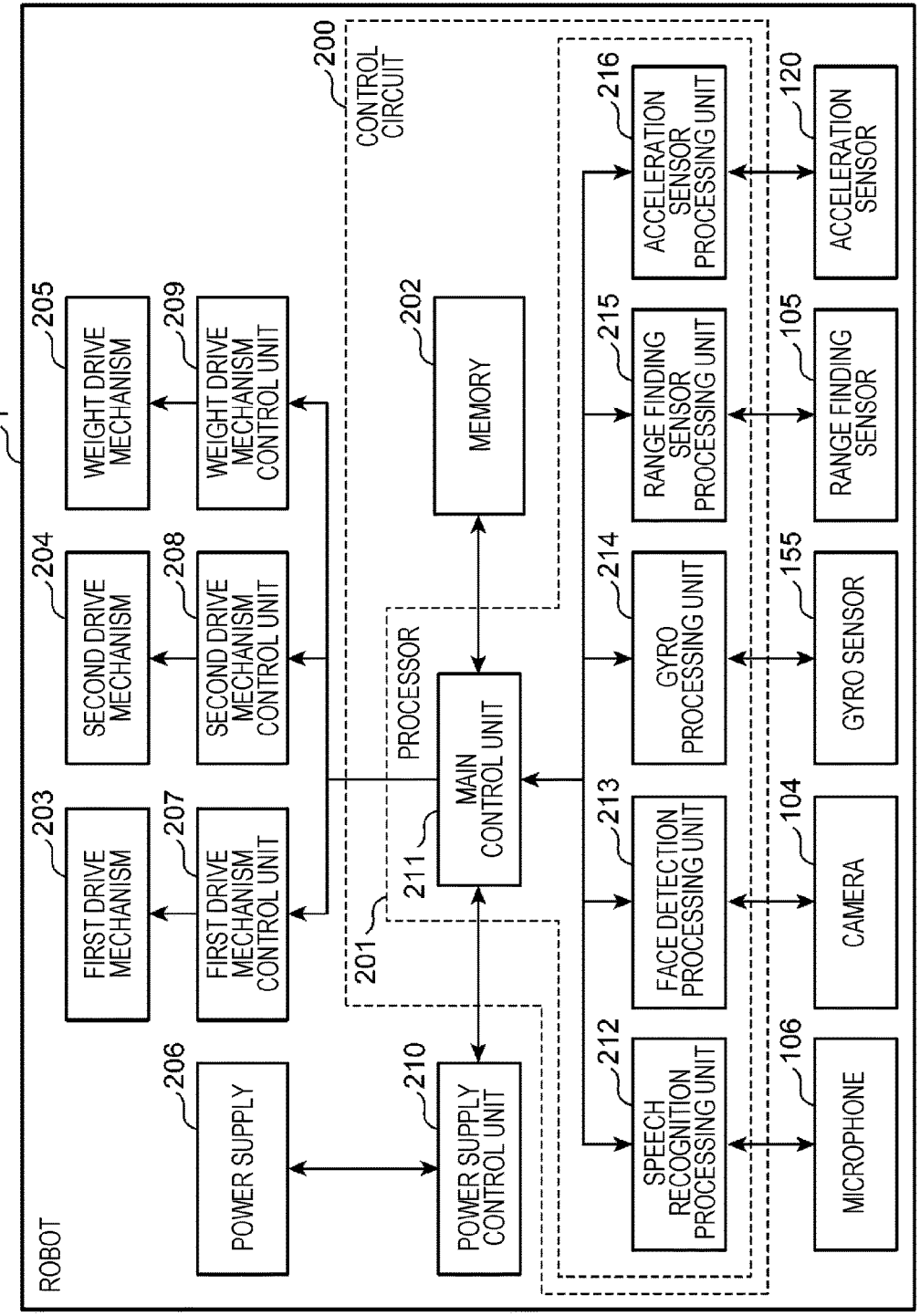
FIG. 11 is a block diagram of the robot according to the embodiment of the present disclosure.

Although not illustrated in FIG. 3, the robot 1 includes a control circuit 200 (refer to FIG. 11). The control circuit 200 controls a variety of operations performed by the robot 1. The control circuit 200 (refer to FIG. 11) is described in detail below.

The operation performed by the first drive mechanism 203 (refer to FIG. 11) is described in detail below with reference to FIGS. 6A, 6B, and 6C.

FIG. 6B is an internal side view of the robot 1 having the first display portion 108, the second display portion 109, and the third display portion 110 which are tilted upward as viewed in direction VIA, VIB, VIC in FIG. 3, according to the embodiment of the present disclosure. FIG. 6C is an internal side view of the robot 1 having the first display portion 108, the second display portion 109, and the third display portion 110 which are tilted downward as viewed in direction VIA, VIB, VIC in FIG. 3, according to the embodiment of the present disclosure.

As illustrated in FIG. 6A, the first display portion 108, the second display portion 109, and the third display portion 110 located at default positions face in the frontward direction of the robot 1. When the second motor 121 (refer to FIG. 3) is driven, the third gear 126 connected to the second motor 121 rotates. The drive power of the second motor 121 is transferred to the fourth gear 127 via the drive belt 122, and the shaft 115 having the fourth gear 127 fixed thereto is rotated in synchronization with the driving of the second motor 121. As illustrated in FIG. 2, the fixed sheet metal plate 111 is joined to the shaft 115 via the first arm 112 and the second arm 113. In addition, the first spherical cap portion 102 and the second spherical cap portion 103 are joined to each other by a shaft 115 (refer to FIG. 4). Thus, due to the rotation of the shaft 115, that is, the rotation of the first spherical cap portion 102 and the second spherical cap portion 103, the first display portion 108, the second display portion 109, and the third display portion 110 provided on the fixed sheet metal plate 111 also rotate together with the shaft 115.

As illustrated in FIG. 6B, when the shaft 115 is rotated in a direction indicated by an arrow 128 and an arrow 129 from the above-described default position, the first display portion 108, the second display portion 109 (refer to FIG. 2) and the third display portion 110 are tilted upward, as indicated by an arrow 130. Note that the direction indicated by the arrows 128 and 129 is the clockwise direction about the shaft 115 as viewed in direction VIA, VIB, VIC (refer to FIG. 3). The upward direction indicated by the arrow 130 is the clockwise direction around the shaft 115 as viewed in direction VIA, VIB, VIC (refer to FIG. 3).

Although not illustrated in FIG. 6B, the first spherical cap portion 102 (refer to FIG. 1B) and the second spherical cap portion 103 (refer to FIG. 1B) that rotate in synchronization with the shaft 115 are also tilted upward as indicated by the arrow 130. That is, the optical axis of the camera 104 and the optical axis of the range finding sensor 105 mounted in the first spherical cap portion 102 (refer to FIG. 1B) and the second spherical cap portion 103 (refer to FIG. 1B), respectively, are also tilted upward as indicated by the arrow 130.

In addition, as illustrated in FIG. 6C, if the third gear 126 is rotated from the above-described default position counterclockwise as indicated by the arrow 131 and, thus, the fourth gear 127 and the shaft 115 are rotated counterclockwise indicated by the arrow 132, the first display portion 108, the second display portion 109 (refer to FIG. 2), and the third display portion 110 are tilted downward as indicated by an arrow 133. Note that the downward direction indicated by the arrow 133 is a counterclockwise direction about the shaft 115 as viewed in direction VIA, VIB, VIC (refer to FIG. 3). Although not illustrated in FIG. 6C, the first spherical cap portion 102 (refer to FIG. 1B) and the second spherical cap portion 103 (refer to FIG. 1B) which rotate in synchronization with the shaft 115 are also tilted downward as indicated by the arrow 133. That is, the optical axis of the camera 104 and the optical axis of the range finding sensor 105 mounted in the first spherical cap portion 102 (refer to FIG. 1B) and the second spherical cap portion 103 (refer to FIG. 1B), respectively, are also tilted downward, as indicated by the arrow 133.

The operation performed by the second drive mechanism 204 (refer to FIG. 11) is described in detail below with reference to FIGS. 7A and 7B.

Figure 7A:
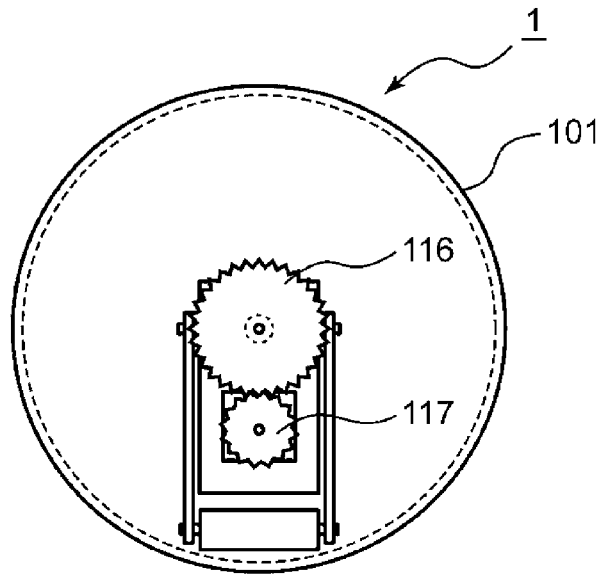
FIG. 7A is a side view of a second drive mechanism of the robot as viewed in direction VIIA, VIIB in FIG. 3, according to the embodiment of the present disclosure.

FIG. 7A is a side view of the second drive mechanism 204 (refer to FIG. 11) of the robot 1 as viewed in direction VIIA, VIIB in FIG. 3 according to the embodiment of the present disclosure. FIG. 7B is a side view illustrating the rectilinear motion of the robot 1 as viewed in direction VIIA, VIIB in FIG. 3.

In FIG. 7A, if the first motor 118 (refer to FIG. 3) is driven, the second gear 117 connected to the first motor 118 rotates. The drive power is transferred to the first gear 116 meshing with the second gear 117. As a result, the main casing 101 having the first gear 116 fixed thereto rotates in synchronization with the driving of the first motor 118.

Figure 7B:
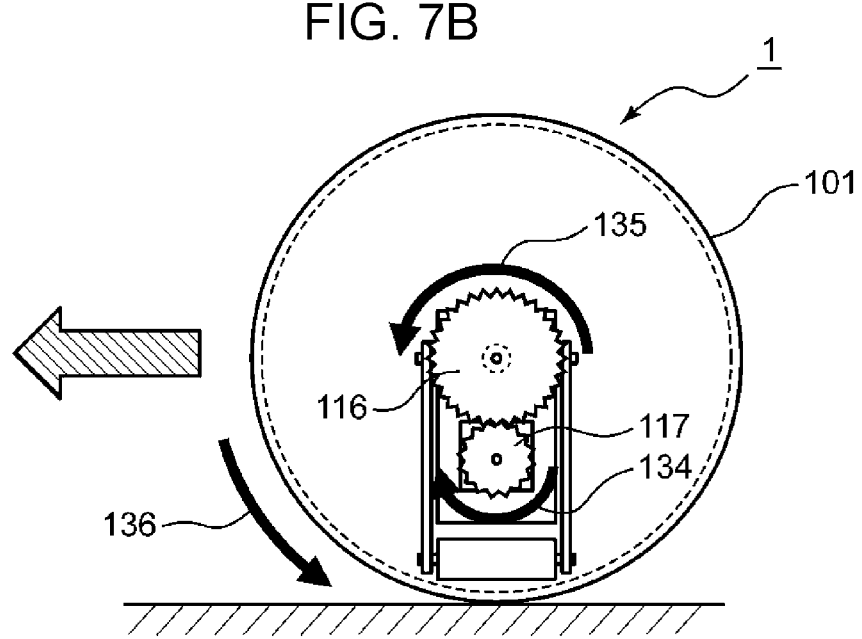
FIG. 7B is a side view illustrating the rectilinear motion of the robot as viewed in direction VIIA, VIIB in FIG. 3.

In FIG. 7B, if the first motor 118 (refer to FIG. 3) is rotated in the direction of an arrow 134, the first gear 116 meshing with the second gear 117 rotates in the direction of an arrow 135. Note that the direction of the arrow 134 is the clockwise direction about the second gear 117 as viewed in direction VIIA, VIIB (refer to FIG. 3). In addition, the direction of the arrow 135 is the counterclockwise direction about the shaft 115 as viewed in direction VIIA, VIIB (refer to FIG. 3). At this time, the main casing 101 having the first gear 116 fixed thereto rotates in the direction of an arrow 136. Note that the direction of the arrow 136 is the counterclockwise direction about the shaft 115 as viewed in direction VIIA, VIIB (refer to FIG. 3). As a result, the robot 1 moves forward. In contrast, if the first motor 118 is rotated in a direction opposite to the arrow 134, the main casing 101 rotates in a direction opposite to the direction of the arrow 136, so that the robot 1 moves backward. In this manner, the robot 1 can move in either the forward or backward direction by switching the rotation direction of the first motor 118 in the second drive mechanism 204 (refer to FIG. 11).

The operation performed by the weight drive mechanism 205 (refer to FIG. 11) is described in detail below with reference to FIGS. 8A and 8B.

Figure 8A:
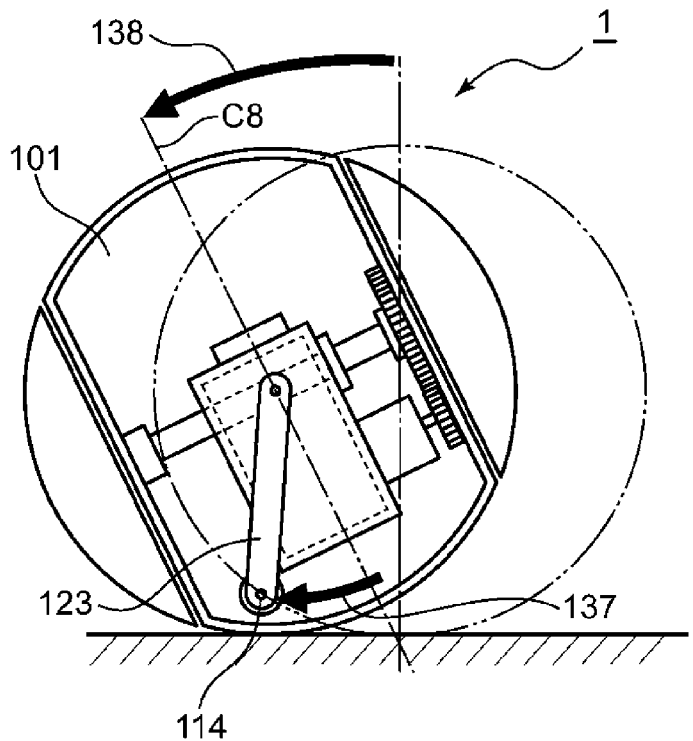
FIG. 8A is an internal rear view illustrating the posture of the robot when a weight of the robot is positioned on the left side in FIG. 3.

FIG. 8A is an internal rear view illustrating the posture of the robot 1 when the weight 114 of the robot 1 is positioned on the left side in FIG. 3. FIG. 8B is an internal rear view illustrating the posture of the robot 1 when the weight 114 of the robot 1 is positioned on the right side in FIG. 3.

As illustrated in FIG. 8A, if the weight 114 is moved from a medial line C8 to the left as indicated by an arrow 137 by driving the third motor 125 (FIG. 5), the posture of the robot 1 is tilted in a direction indicated by an arrow 138. Note that the medial line C8 is a line passing through the upper vertex and the lower vertex of the main casing 101. The "left direction" indicated by the arrow 137 refers to the clockwise direction when the robot 1 is viewed from the back to the front. In addition, the direction indicated by the arrow 138 refers to the counterclockwise direction about the contact point between the ground and the robot 1.

Figure 8B:
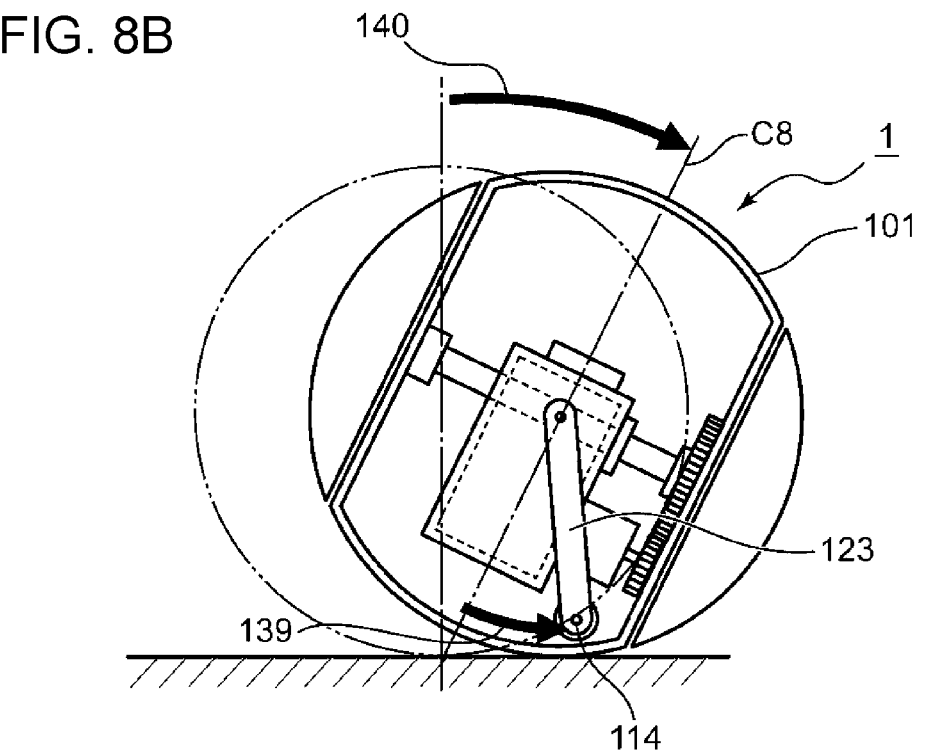
FIG. 8B is an internal rear view illustrating the posture of the robot when the weight of the robot is positioned on the right side in FIG. 3.

As illustrated in FIG. 8B, if the weight 114 is moved from the medial line C8 to the right as indicated by an arrow 139 by driving the third motor 125 (refer to FIG. 5) in the opposite direction, the posture of the robot 1 is tilted in the direction indicated by an arrow 140. Here, the "right" indicated by the arrow 139 refers to a counterclockwise direction when the robot 1 is viewed from the back to the front. The direction indicated by the arrow 140 refers to the clockwise direction about the contact point between the ground and the robot 1. Note that when, as illustrated in FIG. 3, the weight 114 is tilted to neither the right nor the left and, thus, third arm 123 and the fourth arm 124 are oriented in the vertical direction, the position of the weight 114 is referred to as an "initial position".

A state in which the operation performed by the second drive mechanism 204 (refer to FIG. 11) and the operation performed by the weight drive mechanism 205 (refer to FIG. 11) are simultaneously driven is described with reference to FIGS. 8A and 8B.

As illustrated in FIG. 8A, if the first motor 118 drives the robot 1 such that the robot 1 moves in the travel direction with the posture of the robot 1 tilted in the direction indicated by the arrow 138, the robot 1 turns to the left as seen in top view. In contrast, as illustrated in FIG. 8B, if the first motor 118 drives the robot 1 such that the robot 1 moves in the travel direction with the posture of the robot 1 tilted in the direction indicated by the arrow 140, the robot 1 turns to the right as seen in top view.

As described above, the travel direction of the robot 1 can be switched to the left or right by combining shifting of the weight 114 to the left or right by using the weight drive mechanism 205 (refer to FIG. 11) with forward or backward motion of the main casing 101 by using the second drive mechanism 204 (refer to FIG. 11). Thus, the robot 1 can turn to the right or left while moving.

The posture of the robot 1 at the start of traveling is described below with reference to FIG. 9.

Figure 9:
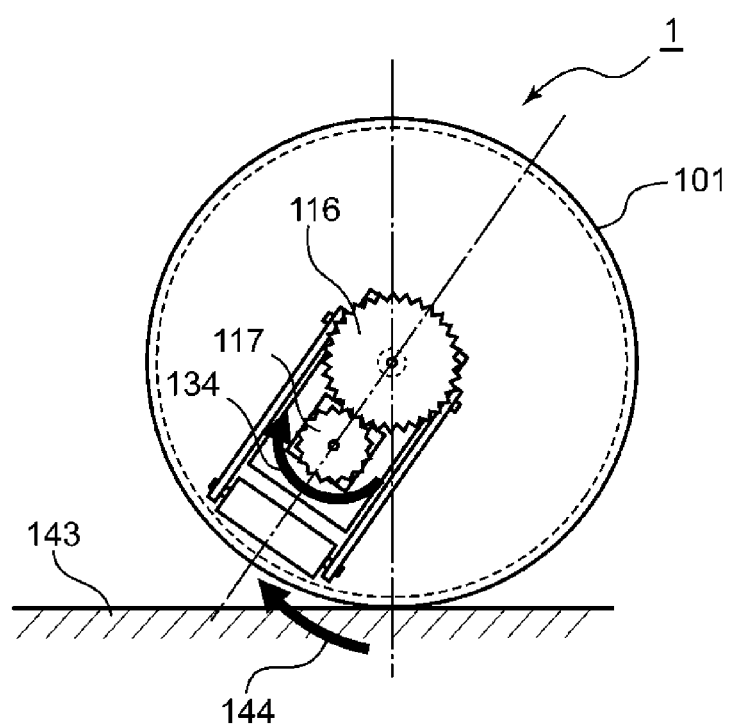
FIG. 9 illustrates the posture of the robot until a main casing starts rotating in the direction of an arrow 136 illustrated in FIG. 7B.

FIG. 9 illustrates the posture of the robot 1 until the main casing 101 starts rotating in the direction of the arrow 136 illustrated in FIG. 7B. If the drive force generated by the second drive mechanism 204 (refer to FIG. 11) is larger than the force caused by an external factor, such as friction of the floor surface 143, the main casing 101 moves in the direction indicated by the arrow 136 (refer to FIG. 7B). However, if the drive force generated by the second drive mechanism 204 (refer to FIG. 11) is smaller than the force caused by an external factor, such as friction of the floor surface 143, the main casing 101 does not start rotating. At this time, when the main casing 101 does not rotate, the first gear 116 does not rotate either, since the first gear 116 is fixed to the main casing 101. In FIG. 9, in the case where the main casing 101 does not rotate, if the first motor 118 is rotated in the direction of the arrow 134, the second gear 117 moves along the teeth of the meshed first gear 116. Since the second gear 117 and the first motor 118 are fixed to the frame 119 (refer to FIG. 3), the second gear 117 and the first motor 118 rotate in the direction of an arrow 144 together with the frame 119 (refer to FIG. 3) and the weight drive mechanism 205 (refer to FIG. 11) and the gyro sensor 155 (refer to FIG. 3) fixed to the frame 119 (refer to FIG. 3). Note that the direction of the arrow 144 is the clockwise direction about the shaft 115 as viewed in direction VIIA, VIIB (refer to FIG. 3).

As a result, the pitch angle of the main casing 101 increases due to the influence of a force based on external factors until the robot 1 starts traveling. In addition, the gyro sensor 155 is attached to the frame 119, and the pitch angle of the frame 119 also increases as the pitch angle of the main casing 101 increases. Thus, the gyro sensor 155 can detect the angle of the main casing 101 in the pitch direction.

Figure 10:
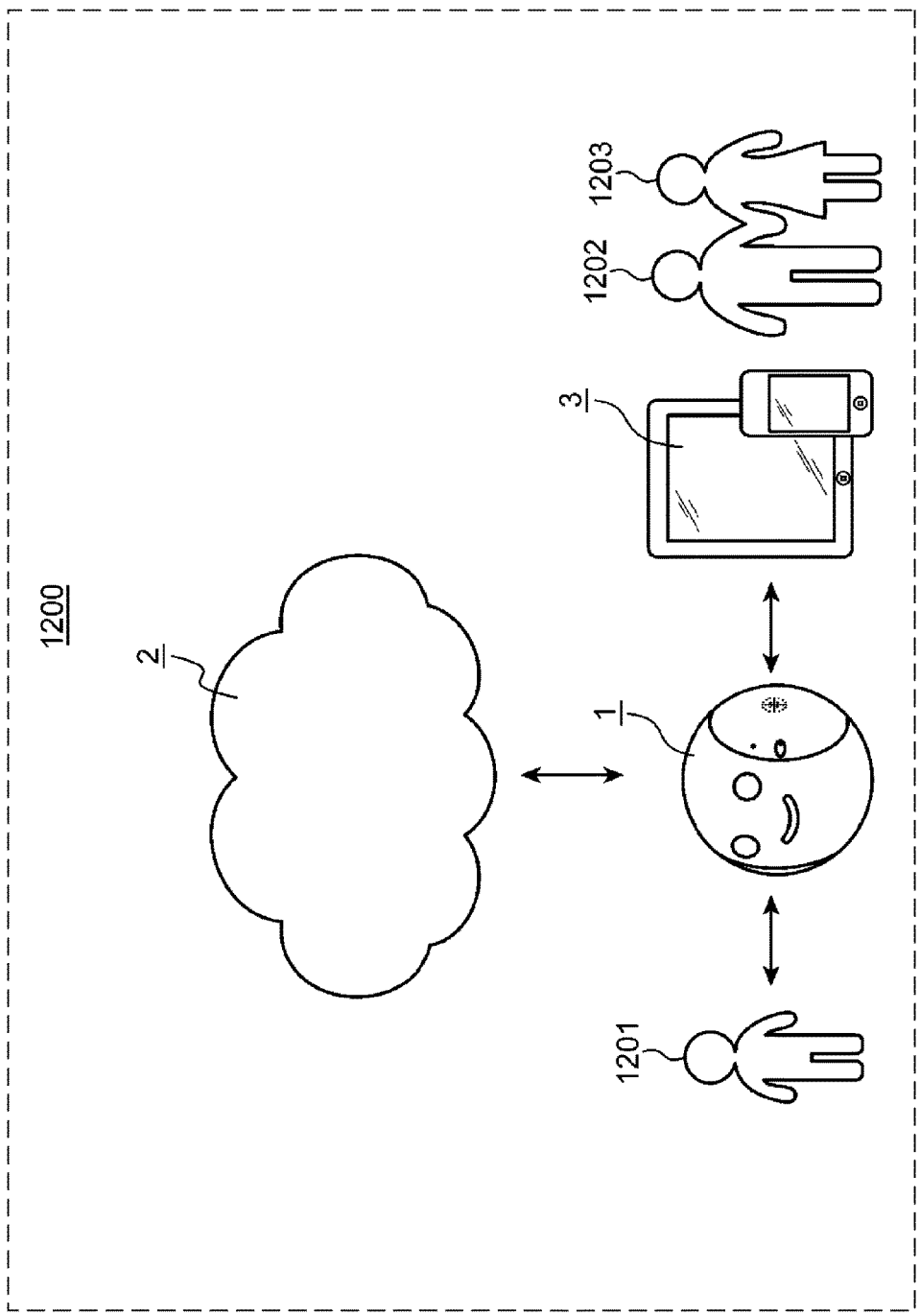
FIG. 10 illustrates an example of the overall configuration of a robot system including the robot according to an embodiment of the present disclosure.

An example of the overall configuration of a robot system 1200 including the robot 1 according to the embodiment of the present disclosure is described below with reference to FIG. 10. FIG. 10 illustrates an example of the overall configuration of the robot system 1200 including the robot 1 according to an embodiment of the present disclosure. The robot system 1200 includes a cloud server 2, a mobile terminal 3, and the robot 1. The robot 1 is connected to the Internet via, for example, Wifi (registered trademark) communication and is connected to the cloud server 2. In addition, the robot 1 is connected to the mobile terminal 3 via, for example, Wifi (registered trademark) communication. A user 1201 is, for example, a child, and users 1202 and 1203 are, for example, the parents of the child.

For example, if the robot 1 receives, via the mobile terminal 3, an instruction to read a certain picture book aloud to a child, the robot 1 starts reading the picture book to the child. For example, upon receiving a question from the child while reading the picture book, the robot 1 sends the question to the cloud server 2, receives an answer to the question from the cloud server 2, and utters speech corresponding to the answer.

In this way, the users 1201 to 1203 can treat the robot 1 like a pet and learn a language through interaction with the robot 1.

Block Diagram

An internal circuit of the robot 1 according to the embodiment of the present disclosure is described in detail below with reference to FIG. 11. FIG. 11 is a block diagram of the robot 1 according to the embodiment of the present disclosure.

As illustrated in FIG. 11, the robot 1 includes the control circuit 200, the first drive mechanism 203, a first drive mechanism control unit 207, the second drive mechanism 204, a second drive mechanism control unit 208, the weight drive mechanism 205, a weight drive mechanism control unit 209, a power supply 206, a power supply control unit 210, the microphone 106, the camera 104, the gyro sensor 155, the range finding sensor 105, and an acceleration sensor 120.

The control circuit 200 includes a processor 201 and a memory 202. The processor 201 is formed from, for example, at least one of a central processing unit (CPU), a field programmable gate array (FPGA), and an application specific integrated circuit (ASIC) and includes a main control unit 211, a speech recognition processing unit 212, a face detection processing unit 213, a gyro processing unit 214, a range finding sensor processing unit 215, and an acceleration sensor processing unit 216. The memory 202 is, for example, a rewritable nonvolatile memory.

The main control unit 211 acquires, from the speech recognition processing unit 212, the result of recognition of the speech of a person. The main control unit 211 acquires, from the face detection processing unit 213, the result of recognition of the face of a person. The main control unit 211 acquires, from the gyro processing unit 214, the measurement value that is measured by the gyro sensor 155 and that indicates the posture of the robot 1. The main control unit 211 acquires, from the range finding sensor processing unit 215, the measurement value that is measured by the range finding sensor 105 and that indicates the distance from the range finding sensor 105 to an object located in front of the robot 1. The main control unit 211 acquires, from the acceleration sensor processing unit 216, the measurement value that is measured by the acceleration sensor 120 and that indicates the acceleration of the robot 1. The main control unit 211 acquires, from the power supply control unit 210, a charging flag indicating whether the power supply 206 is in a charged state and the remaining capacity of the power supply 206.

The main control unit 211 generates a control command of the robot 1 on the basis of the information acquired from the speech recognition processing unit 212, the face detection processing unit 213, the gyro processing unit 214, the range finding sensor processing unit 215, the acceleration sensor processing unit 216, and the power supply control unit 210 and outputs the generated control command to the first drive mechanism control unit 207, the second drive mechanism control unit 208, and the weight drive mechanism control unit 209. The control command is described in more detail below.

The speech recognition processing unit 212 determines the presence or absence of the speech of a person from the audio data acquired by the microphone 106 and manages the speech recognition result. The speech recognition processing unit 212 includes a speech recognition table in which the features of the speeches of one or more predetermined persons who use the robot 1 are associated with the identifiers of the persons. Thereafter, the speech recognition processing unit 212 calculates the degree of coincidence between the feature of the speech extracted from the audio data acquired by the microphone 106 and the feature of the speech of each of the persons stored in the speech identification table. Subsequently, the speech recognition processing unit 212 identifies, from among the persons listed in the speech identification table, a person having the degree of coincidence of the feature that is higher than a predetermined threshold and that is the highest as the person who uttered the speech included in the audio data acquired by the microphone 106. Thereafter, the speech recognition processing unit 212 outputs, to the main control unit 211, data in which the identifier of the identified person is associated with, for example, the recognition time as the recognition result of the speech of the person. Note that, for example, voice print data can be employed as the feature of the speech.

The face detection processing unit 213 recognizes a person positioned in front of the robot 1 on the basis of the image data acquired by the camera 104. The face detection processing unit 213 includes a face identification table in which the feature of the face of each of one or more predetermined persons who use the robot 1 is associated with the identifier of the person. Thereafter, the face detection processing unit 213 calculates the degree of coincidence between the feature of each of one or more faces extracted from the image data acquired by the camera 104 and the feature of the face of each of the persons listed in the face identification table. Subsequently, for each of the persons included in the image data, the face detection processing unit 213 recognizes, from among the persons listed in the face identification table, the person having the degree of coincidence of the feature that is higher than a predetermined threshold and that is the highest as the corresponding person. Note that for example, the relative positions of the eyes, nose, and mouth in the face and the outline of the face can be employed as the feature of a face. Subsequently, the face detection processing unit 213 outputs, to the main control unit 211, the image data obtained by tagging the identifier of the person at the position of the face of each of the persons included in the image data as the recognition result of the face of the person.

The gyro processing unit 214 sequentially acquires measurement values measured by the gyro sensor 155 at predetermined sampling intervals and sequentially outputs the measurement values to the main control unit 211.

The gyro sensor 155 is a gyro sensor that measures the angles of three components, that is, a roll angle, a pitch angle, and a yaw angle. As illustrated in FIG. 2, the term "roll angle" refers to a rotation angle about the X-axis, the term "pitch angle" refers to a rotation angle about the Y-axis, and the term "yaw angle" refers to a rotation angle about the Z-axis. The X-axis is the roll axis and is an axis extending in the frontward direction of the robot 1. The Y-axis is the pitch axis and is an axis extending in the right-left direction of the robot 1. The Z-axis is the yaw axis and is an axis extending in the vertical direction of the robot 1. The X-axis, the Y-axis, and the Z-axis are orthogonal to one another.

The range finding sensor processing unit 215 sequentially acquires measurement values measured by the range finding sensor 105 at predetermined sampling periods and sequentially outputs the measurement values to the main control unit 211.

The range finding sensor 105 is an infrared range sensor that measures the distance from the sensor to the object, for example, by emitting infrared light onto an object in front and measuring the time it takes the reflected light to return to the sensor. Note that the range finding sensor 105 may be configured as a distance image sensor for measuring the distance distribution of the surroundings in front of the robot 1 or may be configured by a stereo camera, for example.

The acceleration sensor processing unit 216 sequentially acquires measurement values measured by the acceleration sensor 120 at predetermined sampling intervals and sequentially outputs the measurement values to the main control unit 211.

The acceleration sensor 120 is, for example, a three-axis acceleration sensor that measures three acceleration components along the X-axis, the Y-axis, and the Z-axis illustrated in FIG. 2.

For example, the first drive mechanism control unit 207 includes a control circuit that controls the second motor 121 constituting the first drive mechanism 203. The first drive mechanism control unit 207 drives the first drive mechanism 203 in accordance with a control command transmitted from the main control unit 211. The first drive mechanism 203 includes the shaft 115 (refer to FIG. 3) that joins the first spherical cap portion 102 to the second spherical cap portion 103, the fourth gear 127 (refer to FIG. 6A) attached to the shaft 115, the drive belt 122 (refer to FIG. 6A) attached to the fourth gear 127, the third gear 126 (refer to FIG. 6A) that transfers driving power to the drive belt 122, the second motor 121 (refer to FIG. 3) connected to the third gear 126, and the frame 119 (refer to FIG. 3) that fixes the second motor 121. The first drive mechanism 203 is a mechanism that controls the rotation of the shaft 115. By rotating the shaft 115, the first drive mechanism 203 rotates the first spherical cap portion 102, the second spherical cap portion 103, the first display portion 108, the second display portion 109, and the third display portion 110 in the pitch direction. In addition, with the rotation in the pitch direction, the optical axis of the range finding sensor 105 and the optical axis of the camera 104 rotate in the pitch direction.

For example, the second drive mechanism control unit 208 includes a control circuit that controls the first motor 118 constituting the second drive mechanism 204. The second drive mechanism control unit 208 drives the second drive mechanism 204 in accordance with a control command output from the main control unit 211. The second drive mechanism 204 includes the first gear 116 (refer to FIG. 7A) fixed to the main casing 101, the second gear 117 (refer to FIG. 7A) meshing with the first gear 116, and the first motor 118 (refer to FIG. 3) connected to the second gear 117. The second drive mechanism 204 is a mechanism that controls the rotation of the main casing 101. By rotating the main casing 101, the second drive mechanism 204 moves the robot.

The weight drive mechanism control unit 209 includes, for example, a control circuit that controls the third motor 125 constituting the weight drive mechanism 205. The weight drive mechanism control unit 209 drives the weight drive mechanism 205 in accordance with a control command transmitted from the main control unit 211. The weight drive mechanism 205 includes the third arm 123 (refer to FIG. 5) that supports one end of the weight 114, the fourth arm 124 that supports the other end of the weight 114, and the third motor 125 (refer to FIG. 5) connected to the fourth arm 124 via the weight shaft 124a. The weight drive mechanism 205 is a mechanism that controls the rotation of the weight 114 around the weight shafts 123a and 124a. By rotating the weight shafts 123a and 124a, the weight drive mechanism 205 causes the weight 114 to tilt to the right or left (in the roll direction).

The power supply control unit 210 manages the charging flag indicating whether the power supply 206 is being charged and a remaining capacity of the power supply 206. The power supply control unit 210 outputs the charging flag and the remaining capacity to the main control unit 211. In addition, when the robot 1 is connected to a charger, the power supply control unit 210 accumulates, in the power supply 206, electric power supplied from the charger.

The power supply 206 is formed from a secondary battery, such as a lithium ion battery, and constitutes the power supply of the robot 1.

Pivot Turn Process

As described in FIG. 8A, if, in the robot 1, the weight 114 is rotated to the left around the weight shafts 123a and 124a and the first motor 118 is rotated in the forward direction, the robot 1 turns to the left. Similarly, if the weight 114 is rotated to the right around the weight shafts 123a and 124a and the first motor 118 is rotated in the forward direction, the robot 1 turns to the right.

Hereinafter, these left turn and right turn are collectively referred to as a "normal turn". By making a normal turn, the robot 1 can travel while avoiding a collision with an object in front. However, the turning radius (a second turning radius) of the robot 1 at the time of normal turn is large. Accordingly, if the robot 1 makes a normal turn in, for example, a turning space such as a space near a wall, the robot 1 may collide with the wall, which prevents the robot 1 from making a turn.

For this reason, according to the present disclosure, by making a pivot turn with a turning radius which is smaller than that in a normal turn (a first turning radius), the robot 1 can make a turn at a place where the turning space is limited.

FIG. 12 illustrates the state of the robot 1 when the pivot turn process is performed. In FIG. 12, a "pivot turn behavioral state" is one of the states of the robot 1 and is a state when the pivot turn process is performed. The robot 1 has four states indicated by "1" to "4" in the pivot turn behavioral state. In the pivot turn process, the robot 1 enters the pivot turn states indicated by "1" to "4" in this order.

The term "control amount set for the weight drive mechanism" refers to the control amount set for the weight drive mechanism 205 that performs a pivot turn process. In this example, the following two kinds of "control amount to be set to the weight drive mechanism" are used: a "right rotation control amount" (an example of a first rotation control amount) and "left rotation control amount" (an example of a second rotation control amount).

The "right rotation control amount" is a control amount to rotate the weight 114 to the right around the weight shafts 123a and 124a, and the "left rotation control amount" is a control amount to rotate the weight 114 to the left around the weight shafts 123a and 124a. The phrase "rotating the weight 114 to the right around the weight shafts 123a and 124a" as used herein refers to rotating the weight 114 counterclockwise around the X-axis by a predetermined angle as viewed from the back to the front, and the phrase "rotating the weight 114 to the left around the weight shafts 123a and 124a" as used herein refers to rotating the weight 114 clockwise around the X-axis by a predetermined angle as viewed from the back to the front.

The term "control amount set for the second drive mechanism" refers to the control amount for the second drive mechanism 204 that performs the pivot turn process. In this example, the following three kinds of control amount for the second drive mechanism 204 are used: a "stop control amount", an "acceleration control amount in the forward direction" (an example of a first acceleration control amount), and an "acceleration control amount in the backward direction" (an example of a second acceleration control amount).

The "stop control amount" is used to stop the rotation of the first motor 118 constituting the second drive mechanism 204. The "acceleration control amount in the forward direction" is used to increase the speed of the robot 1 in the forward direction at a predetermined acceleration. The "acceleration control amount in the backward direction" is used to increase the speed of the robot 1 in the backward direction at a predetermined acceleration.

The main control unit 211 outputs the "stop control amount" to the second drive mechanism control unit 208 first to stop the forward movement and backward movement of the main casing 101. Thereafter, the main control unit 211 outputs the "right rotation control amount" to the weight drive mechanism control unit 209 so that the robot 1 enters the pivot turn state "1". Thus, as illustrated in the column "State of Robot", the weight 114 is tilted to the right by an angle indicated by the arrow 151 with respect to the Z-axis as viewed from the back to the front. As a result, as viewed from the back to the front, the center of gravity of the robot 1 is shifted to the right, and the Z-axis is tilted to the right by the angle indicated by the arrow 151 with respect to a vertical direction DH. The pivot turn state "1" continues until the main control unit 211 confirms that the robot 1 is actually tilted to the right by a predetermined angle by monitoring the measurement value of the roll angle output from the gyro sensor 155 or until a certain period of time elapses after the confirmation.

Subsequently, after outputting the "right rotation control amount" to the weight drive mechanism control unit 209, the main control unit 211 outputs the "acceleration control amount in the forward direction" to the second drive mechanism control unit 208 so that the robot 1 enters the pivot turn state "2". Thus, as illustrated in the column "State of Robot", the robot 1 moves forward with the Z-axis tilted to the right with respect to the vertical direction DH. As a result, when viewed from above, the robot 1 turns forward to the right, as indicated by an arrow 152. The pivot turn state "2" continues until the main control unit 211 confirms that the first motor 118 actually rotates by monitoring the measurement value of a rotary encoder of the first motor 118 or until a certain period of time elapses from the confirmation.

Subsequently, the main control unit 211 outputs the "stop control amount" to the second drive mechanism control unit 208 to stop the forward and backward movement of the main casing 101. Thereafter, the main control unit 211 outputs the "left rotation control amount" to the weight drive mechanism control unit 209 so that the robot 1 enters the pivot turn state "3". Thus, as illustrated in the column "State of Robot", the weight 114 is tilted to the left by an angle indicated by the arrow 153 with respect to the Z-axis as viewed from the back to the front. As a result, as viewed from the back to the front, the center of gravity of the robot 1 is shifted to the left, and the Z-axis is tilted to the left by the angle indicated by the arrow 153 with respect to the vertical direction DH. The pivot turn state "3" continues until the main control unit 211 confirms that the robot 1 is actually tilted to the left by monitoring the measurement value of the roll angle output from the gyro sensor 155 or until a certain period of time elapses after the confirmation.

Subsequently, after outputting the "left rotation control amount" to the weight drive mechanism control unit 209, the main control unit 211 outputs the "acceleration control amount in the backward direction" to the second drive mechanism control unit 208 so that the robot 1 enters the pivot turn state "4". Thus, as illustrated in the column "State of Robot", the robot 1 moves backward with the Z-axis tilted to the left with respect to the vertical direction DH. As a result, when viewed from above, the robot 1 turns backward to the left, as indicated by an arrow 154. The pivot turn state "4" continues until the main control unit 211 confirms that the first motor 118 actually rotates by monitoring the measurement value from the rotary encoder of the first motor 118 or until a certain period of time elapses from the confirmation.

The main control unit 211 defines the series of the pivot turn states "1" to "4" as a pivot turn motion of one cycle and monitors the measurement value of the yaw angle output from the gyro sensor 155. In this manner, the main control unit 211 cyclically performs the pivot turn operation until the front of the robot 1 is oriented in the target direction.

As described above, since the pivot turn is a turn that repeatedly make a forward turn to the right and a backward turn to the left in small motions, the turning radius can be reduced more than that in a normal turn. As a result, the robot 1 can turn its front in the target direction while minimizing the movement amount. In this manner, even in a place where a turning space is limited, the robot 1 can make a turn safely.

Flowchart

FIG. 13 is a flowchart of the process performed by the robot 1 according to the embodiment of the present disclosure. The processing of the flowchart is started when, for example, a predetermined condition is satisfied. Examples of the predetermined condition include a condition that the robot 1 is powered on and a condition that a certain period has elapsed since completion of the processing of the flowchart illustrated in FIG. 13.

The main control unit 211 instructs a timer (not illustrated) to start measuring an elapsed time for determining whether to perform a surroundings search process described below first (S101). Subsequently, to detect voice sounds emitted from the user to call the robot 1, the main control unit 211 instructs the speech recognition processing unit 212 to perform speech recognition on the basis of the audio data acquired by the microphone 106 (S102). Subsequently, to detect the direction of the user who emitted the voice sounds to call the robot 1 from the robot 1, the main control unit 211 instructs the face detection processing unit 213 to perform image recognition on the basis of the image data acquired by the camera 104 (S103).

Subsequently, the main control unit 211 determines whether the robot 1 has been called by the user on the basis of the recognition result of speech recognition in S102 (S104). At this time, if the audio data acquired by the microphone 106 contains the voice of any one of the users listed in the above-described voice identification table and the speech recognition processing unit 212 outputs the speech recognition result indicating that the voice data represents a speech sound corresponding to particular keywords used by the user to call the robot 1, the main control unit 211 can determine that the robot 1 is called by the user. Examples of the particular keywords include the words "Come here!" and a nickname given to the robot 1 in advance.

However, if the robot 1 has not been called by the user (NO in S104), the main control unit 211 acquires the elapsed time measured by the timer (S105).

Subsequently, by using the elapsed time acquired in S105, the main control unit 211 determines whether a situation arises in which the robot 1 has not been called by the user for a predetermined period of time or longer (S106). If the elapsed time acquired in S105 is longer than or equal to the predetermined period of time, that is, if the robot 1 has not been called by the user for more than a predetermined period of time from the start of measurement of the elapsed time (YES in S106), the main control unit 211 performs the surroundings search process (S107). Thereafter, the processing performed by the main control unit 211 returns to S102. In this manner, the robot 1 enters the surroundings search mode. The surroundings search process is described in more detail below with reference to FIG. 14.

However, if the elapsed time acquired in S105 is shorter than the predetermined period of time (NO in S106), the processing performed by the main control unit 211 returns to S102. That is, if the robot 1 has not been called by the user for the predetermined period of time after start of measurement of the elapsed time, the processes in S102 to S106 are repeated.

If, in S104, it is determined that the robot 1 has been called by the user (YES in S104), the main control unit 211 resets the elapsed time measured by the timer (S108).

Subsequently, the main control unit 211 generates a stop control amount for stopping the rotation of the main casing 101 and a rotation stop control amount for returning the weight 114 to the initial position (S109).

Subsequently, the main control unit 211 outputs the stop control amount to the second drive mechanism control unit 208 and outputs a rotation stop control amount to the weight drive mechanism control unit 209 (S110). As a result, the second drive mechanism control unit 208 stops the rotation of the first motor 118 constituting the second drive mechanism 204 and stops the rotation of the main casing 101. In addition, the weight drive mechanism control unit 209 rotates the third motor 125 constituting the weight drive mechanism 205 such that the weight 114 is positioned at the initial position. As a result, the robot 1 is stopped with the Z-axis oriented along the vertical direction.

Subsequently, the main control unit 211 determines whether the front of the robot 1 faces the direction in which the user who called the robot 1 is positioned on the basis of the image recognition result in S103 (S111). If the image recognition result indicating that the user who called the robot 1 is included in the image data acquired by the camera 104 is obtained in S103, the main control unit 211 can determine that the user who called the robot 1 is positioned in frontward direction of the robot 1. Note that if the image recognition result indicating that the image of the user who called the robot 1 is included in the area corresponding to the front of the robot 1 in the image data acquired by the camera 104 is obtained in S103, the main control unit 211 may determine that the user who called the robot 1 is positioned in front of the robot 1. As an example of an area of the image data corresponding to the front of the user, a band-like area formed from a certain range on the left and right from the center line of the image data can be adopted. In addition, if the identifier of the user who called the robot 1 is tagged at the position of the face of the user included in the image data acquired by the camera 104, the main control unit 211 can determine that the image of the user who called the robot 1 is included in the image data.

When the front of the robot 1 faces the direction in which the user is positioned (YES in S111), the front of the robot 1 need not be oriented to the user. Accordingly, the main control unit 211 ends the processing.

However, if the front of the robot 1 is not facing the direction in which the user is positioned (NO in S111), the main control unit 211 outputs, from the loudspeaker 107, a voice message indicating that the robot 1 is searching for the user who called the robot 1 (S112). Thus, the main control unit 211 can let the user know that the robot 1 is dealing with the user's call.

Subsequently, the main control unit 211 performs a pivot turn process (S113). Thus, the robot 1 enters a pivot turn mode. The pivot turn process is described in more detail below with reference to FIG. 15.

Subsequently, to determine whether the front of the robot 1 faces the direction in which the user who called the robot 1 is positioned, the main control unit 211 instructs the face detection processing unit 213 to perform an image recognition process (S114).

Subsequently, the main control unit 211 determines whether the front of the robot 1 is facing the direction in which the user who called the robot 1 is positioned on the basis of the image recognition result in S114 (S115). If the main control unit 211 determines that the front of the robot 1 is facing the direction in which the user who called the robot 1 is positioned (YES in S115), the processing performed by the main control unit 211 proceeds to S116. However, if the main control unit 211 determines that the front of the robot 1 is not facing the direction in which the user who called the robot 1 is positioned (NO in S115), the processing performed by the main control unit 211 returns to S113.

That is, the main control unit 211 instructs the robot 1 to perform the pivot turn process until the user who called the robot 1 appears in the image data acquired by the camera 104.

In S116, the main control unit 211 generates a stop control amount for stopping the rotation of the main casing 101 and a rotation stop control amount for returning the weight 114 to the initial position (S116).

Subsequently, the main control unit 211 outputs the stop control amount to the second drive mechanism control unit 208 and outputs the rotation stop control amount to the weight drive mechanism control unit 209 (S117). As a result, the robot 1 is stopped with the Z-axis oriented along the vertical direction.

Figure 14:
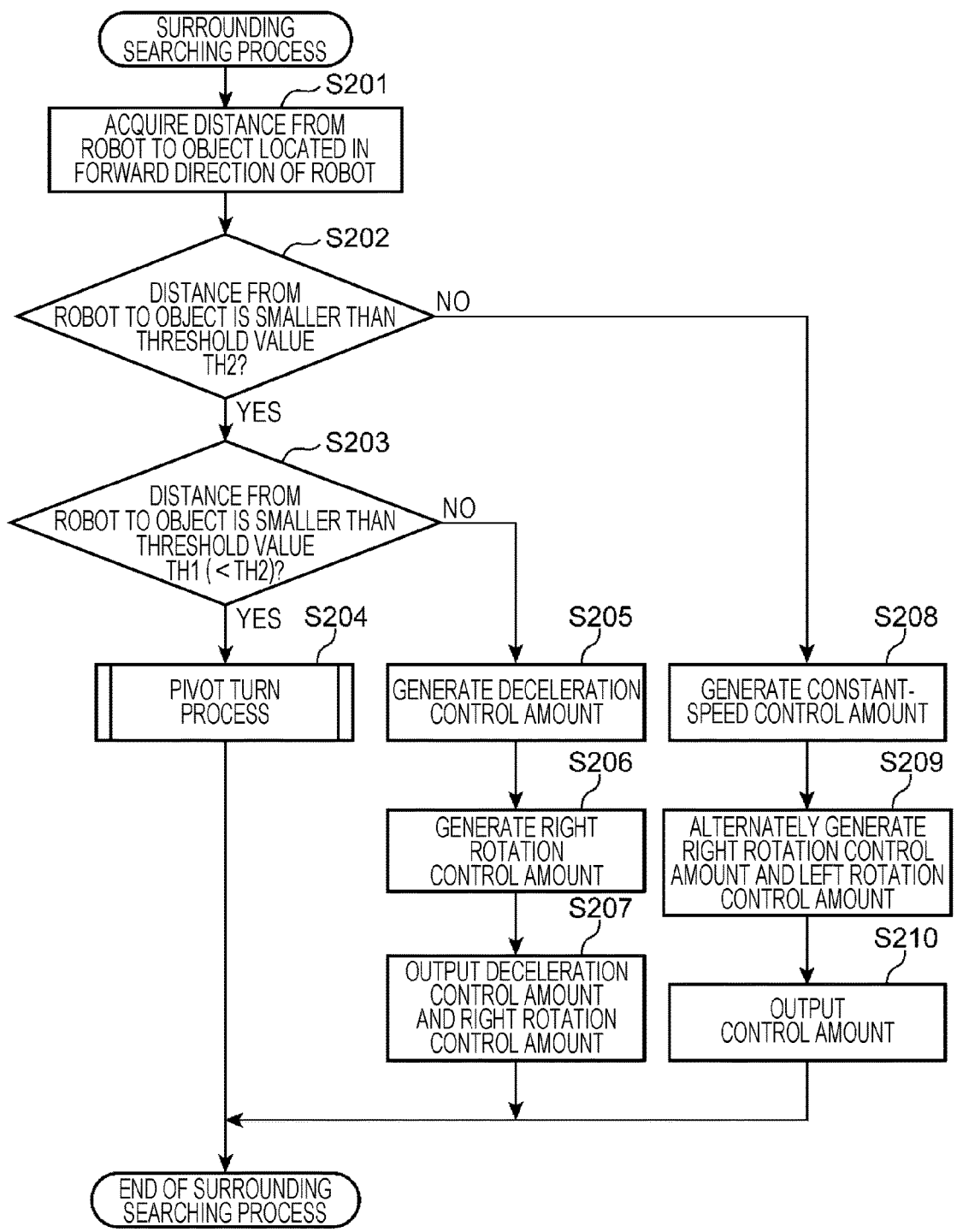
FIG. 14 is a flowchart illustrating the details of a surroundings search process.

FIG. 14 is a flowchart illustrating the details of the surroundings search process. The main control unit 211 acquires, from the range finding sensor processing unit 215, the measurement value output from the range finding sensor 105 as the distance from the robot 1 to the object located in front of the robot 1 first (S201).

Subsequently, the main control unit 211 determines whether the distance from the robot 1 to the object is less than a threshold value TH2 (S202). The threshold value TH2 is an example of the second predetermined value. In this example, the wall of the room corresponds to the object in front. Accordingly, as the threshold value TH2, a value with which the robot 1 can reliably avoid collision with the wall by a normal turn can be adopted, for example. That is, a value obtained by adding a predetermined margin to the turning radius of the robot 1 in a normal turn can be adopted. More specifically, as the threshold value TH2, a value of greater than or equal to about 50 cm and less than about 1 m can be adopted, for example.

If the distance from the robot 1 to the object is less than the threshold value TH2 (YES in S202), the main control unit 211 determines whether the distance from the robot 1 to the object is less than a threshold value TH1 (S203). The threshold value TH1 is less than the threshold value TH2. The threshold value TH1 is an example of the first predetermined value. In this example, as the threshold value TH1, the shortest distance between the robot 1 and the wall that enables the robot 1 to make a normal turn without colliding with the wall can be adopted. That is, a value close to the turning radius of the robot 1 in a normal turn can be adopted. More specifically, as the threshold value TH1, for example, a distance greater than of equal to about 30 cm and less than about 50 cm can be adopted.

If the distance from the robot 1 to the object is less than the threshold value TH1 (YES in S203), the main control unit 211 performs the pivot turn process (S204) and, thereafter, ends the surroundings search process.

However, if the distance from the robot 1 to the object is greater than or equal to the threshold value TH1 (NO in S203), the main control unit 211 generates a deceleration control amount, which is a control amount for moving the robot at a second speed that is lower than the first speed which is a speed to move the robot 1 forward (S205). Subsequently, the main control unit 211 generates a right rotation control amount used to tilt the weight 114 to the right (S206).

Subsequently, the main control unit 211 outputs the deceleration control amount to the second drive mechanism control unit 208 and outputs the right rotation control amount to the weight drive mechanism control unit 209 (S207). Thereafter, the main control unit 211 ends the surroundings search process. In this manner, the second drive mechanism control unit 208 drives the first motor 118 constituting the second drive mechanism 204 such that the main casing 101 rolls in the forward direction at the second speed. In addition, the weight drive mechanism control unit 209 drives the third motor 125 constituting the weight drive mechanism 205 such that the weight 114 tilts to the right by a predetermined angle. As a result, the main casing 101 rolls at the second speed with the weight 114 tilted to the right. Thus, the robot 1 makes a normal turn to the right.

If, in S202, the distance from the robot 1 to the object is greater than or equal to the threshold value TH2 (NO in S202), the main control unit 211 generates a constant-speed control amount for moving the robot 1 at the first speed (S208). Subsequently, the main control unit 211 alternately generates a right rotation control amount for tilting the weight 114 to the right and a left rotation control amount for tilting the weight 114 to the left at predetermined time intervals (S209).

Subsequently, the main control unit 211 outputs the constant-speed control amount to the second drive mechanism control unit 208 and outputs one of the right rotation control amount and the left rotation control amount to the weight drive mechanism control unit 209 (S210). Thereafter, the main control unit 211 ends the surroundings search process. Thus, the second drive mechanism control unit 208 drives the first motor 118 constituting the second drive mechanism 204 such that the main casing 101 rolls in the forward direction at the first speed. As a result, the robot 1 moves forward at the first speed. In addition, the main control unit 211 alternately outputs the right rotation control amount and the left rotation control amount at predetermined time intervals, so that the robot 1 travels in a zigzag line at the first speed.

Figure 15:
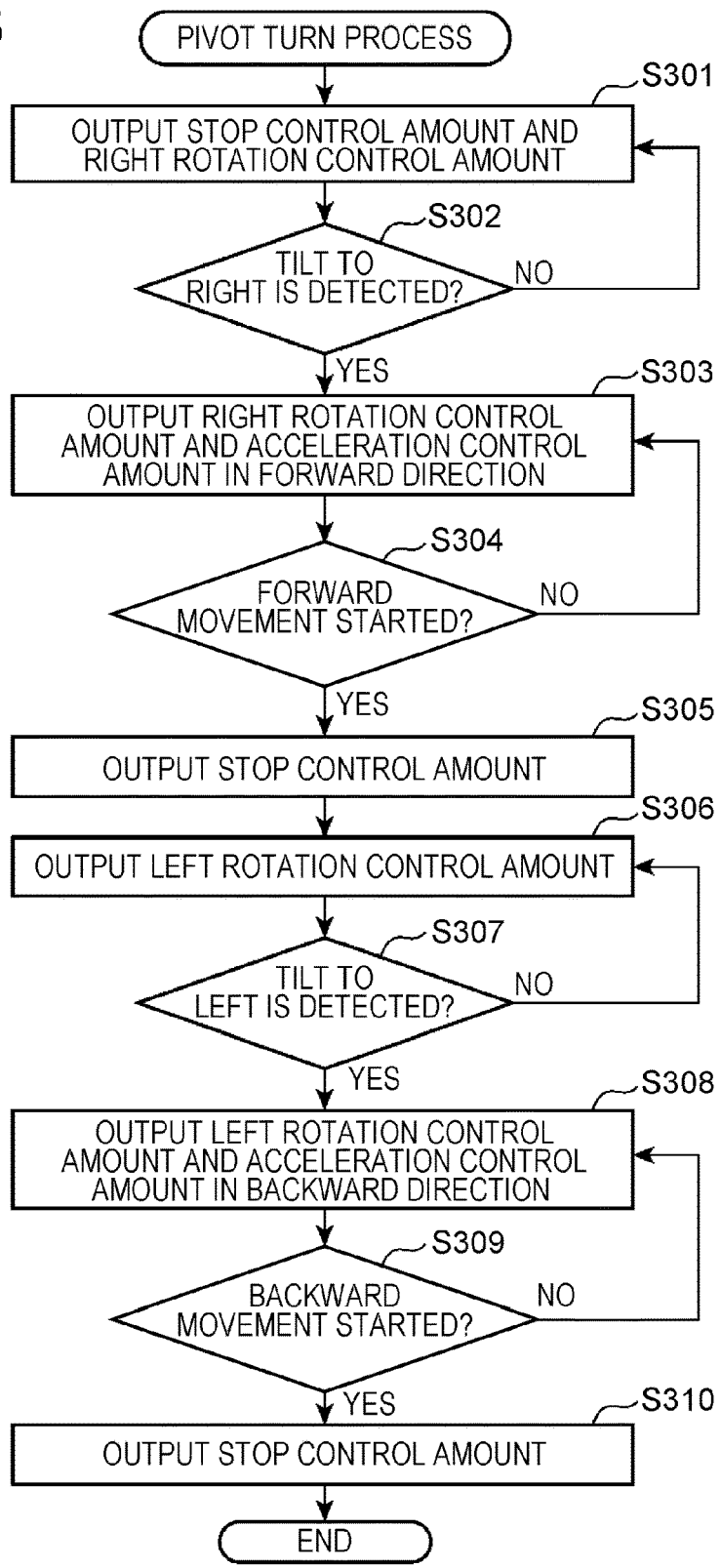
FIG. 15 is a flowchart illustrating the details of the pivot turn process.

FIG. 15 is a flowchart illustrating the details of the pivot turn process. The main control unit 211 outputs the stop control amount to the second drive mechanism control unit 208 and outputs the right rotation control amount to the weight drive mechanism control unit 209 first (S301). As a result, as illustrated in FIG. 12, the robot 1 enters the pivot turn behavioral state "1".

Subsequently, the main control unit 211 monitors the measurement value of the roll angle output from the gyro sensor 155 and detects whether the robot 1 is actually tilted to the right by a predetermined angle (S302). Thereafter, if the main control unit 211 cannot detect that the robot 1 is actually tilted to the right by the predetermined angle (NO in S302), the processing performed by the main control unit 211 returns to S301. However, if the main control unit 211 can detect that the robot 1 is actually tilted to the right by the predetermined angle (YES in S302), the processing proceeds to S303. That is, the processes in S301 and S302 continue until it is detected that the robot 1 is actually tilted to the right by the predetermined angle.

Subsequently, the main control unit 211 outputs the right rotation control amount to the weight drive mechanism control unit 209 and outputs the acceleration control amount in the forward direction to the second drive mechanism control unit 208 (S303). As a result, as illustrated in FIG. 12, the robot 1 enters the pivot turn behavioral state "2".

Subsequently, the main control unit 211 monitors the measurement value output from the rotary encoder of the first motor 118 and detects whether the robot 1 has actually started moving forward (S304). If the robot 1 cannot detect that the robot 1 has actually started moving forward (NO in S304), the processing performed by the main control unit 211 returns to S303. However, if the main control unit 211 can detect that the robot 1 has actually started moving forward (YES in S304), the processing proceeds to S305. That is, the processes in S303 and S304 continue until the main control unit 211 detects that the robot 1 has actually started moving forward.

Subsequently, the main control unit 211 outputs the stop control amount to the second drive mechanism control unit 208 (S305) and outputs the left rotation control amount to the weight drive mechanism control unit 209 (S306). As a result, as illustrated in FIG. 12, the robot 1 enters the pivot turn behavioral state "3".

Subsequently, the main control unit 211 monitors the measurement value of the roll angle output from the gyro sensor 155 and detects whether the robot 1 is actually tilted to the left by a predetermined angle (S307). Thereafter, if the robot 1 cannot detect that the robot 1 is actually tilted to the left by a predetermined angle (NO in S307), the processing performed by the main control unit 211 returns to S306. However, if the main control unit 211 detects that the robot 1 is actually tilted to the left by the predetermined angle (YES in S307), the processing performed by the main control unit 211 proceeds to S308. That is, the processes in S306 and S307 continue until the main control unit 211 detects that the robot 1 is actually tilted to the left by the predetermined angle.

Subsequently, the main control unit 211 outputs the left rotation control amount to the weight drive mechanism control unit 209 and outputs the acceleration control amount in the backward direction to the second drive mechanism control unit 208 (S308). As a result, as illustrated in FIG. 12, the robot 1 enters the pivot turn behavioral state "4".

Subsequently, the main control unit 211 monitors the measurement value output from the rotary encoder of the first motor 118 and detects whether the robot 1 has actually started moving backward (S309). Thereafter, if the main control unit 211 cannot detect that the robot 1 has actually started moving backward (NO in S309), the processing performed by the main control unit 211 returns to S308. However, if the main control unit 211 can detect that the robot 1 has actually started moving backward (YES in S309), the processing performed by the main control unit 211 proceeds to S310. That is, the processes in S308 and S309 continue until the main control unit 211 detects that the robot 1 has actually started moving backward.

Subsequently, the main control unit 211 outputs the stop control amount to the second drive mechanism control unit 208 (S310). In this manner, the backward movement of the robot 1 is stopped.

The flowchart in FIG. 15 illustrates one set of pivot turn processes. By repeating the process of the flowchart in FIG. 15, the robot 1 repeats the pivot turn process and can cause the front of the robot 1 to face the target direction.

Specific Example

Figure 16:
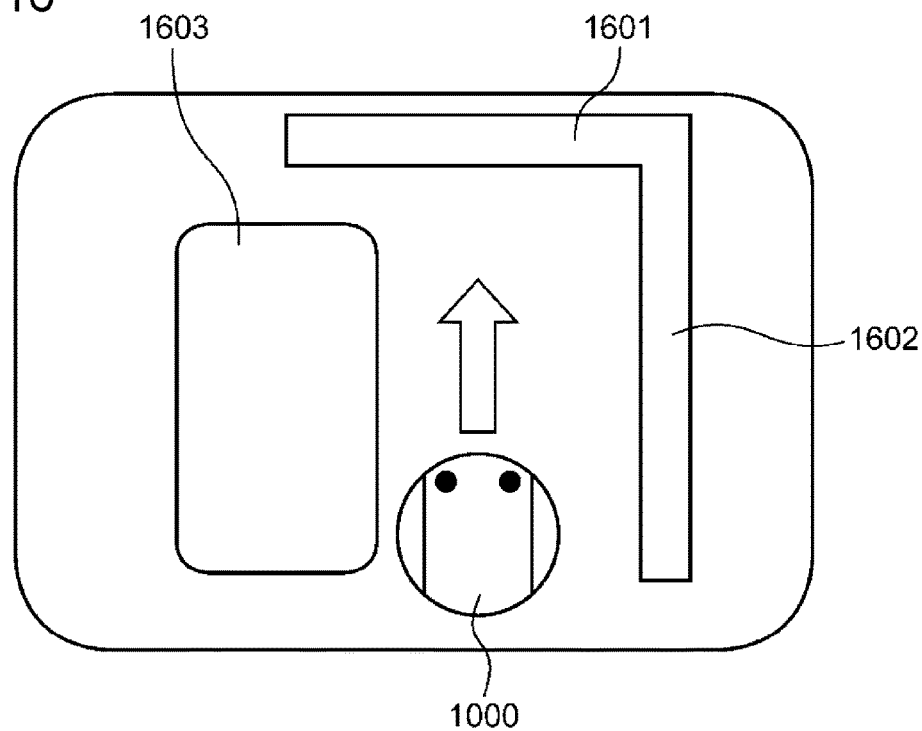
FIG. 16 illustrates a scene in which a robot according to a comparative example travels toward an area near a wall.
Figure 17:
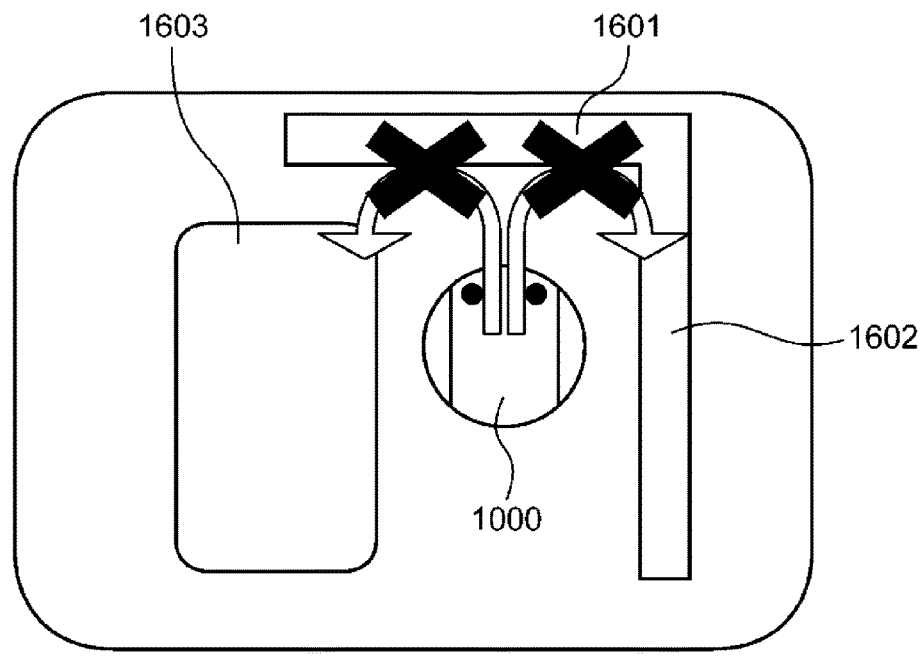
FIG. 17 illustrates a scene in which a robot according to a comparative example fails to turn.
Figure 18:
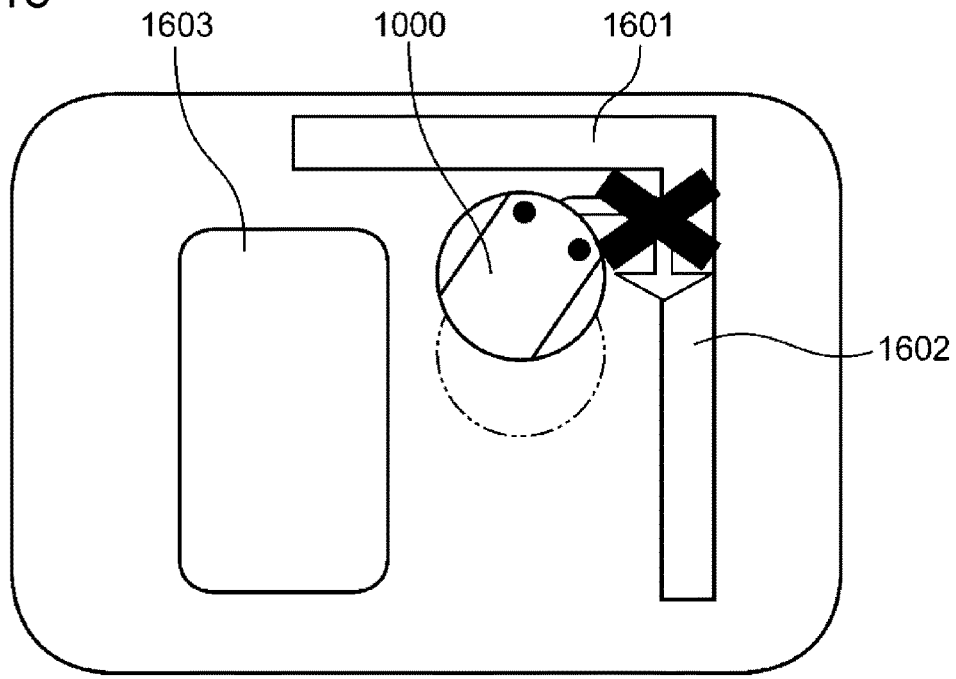
FIG. 18 illustrates a scene in which a robot according to a comparative example fails to turn.

FIG. 16 illustrates a robot 1000 traveling toward an area near a wall according to a comparative example. FIG. 17 illustrates a case C1 in which the robot 1000 according to the comparative example fails to turn. FIG. 18 illustrates a case C2 in which the robot 1000 according to the comparative example fails to turn.

The robot 1000 according to the comparative example does not have the pivot turn function. Therefore, the robot 1000 can only make a normal turn even in a place where the turning space is limited. As illustrated in FIG. 16, the area near a wall is a place where two orthogonal walls 1601 and 1602 intersect as seen in a corner of a room in a house.

In an example illustrated in FIG. 17, since the distance between the robot 1000 and the wall 1601 in front of the robot 1000 is less than a predetermined distance, the robot 1000 starts making a normal turn to the right or to the left. In the case of a normal turn, the turning radius is large. Consequently, in the example illustrated in FIG. 17, the robot 1000 which is making a normal turn to the right collides with the wall 1601 in front and fails to turn. In addition, in the example illustrated in FIG. 17, although the robot 1000 which is making a normal turn to the left can avoid collision with the wall 1601, the robot 1000 collides with a couch 1603 located to the left and fails to turn.

In the example illustrated in FIG. 18, although collision with the wall 1601 can be avoided, the robot 1000 collides with the wall 1602 orthogonal to the wall 1601 and fails to turn. As illustrated in FIG. 18, even if a turn in the area near the front wall 1601 is successful, the wall 1602 appears in front of the robot 1000 immediately after the turn. Consequently, when the robot 1000 makes a normal turn with a large turning radius, the robot 1000 collides with the wall 1602. Eventually, the robot 1000 collides with the walls 1601 or 1602 and fails to turn.

Figure 19:
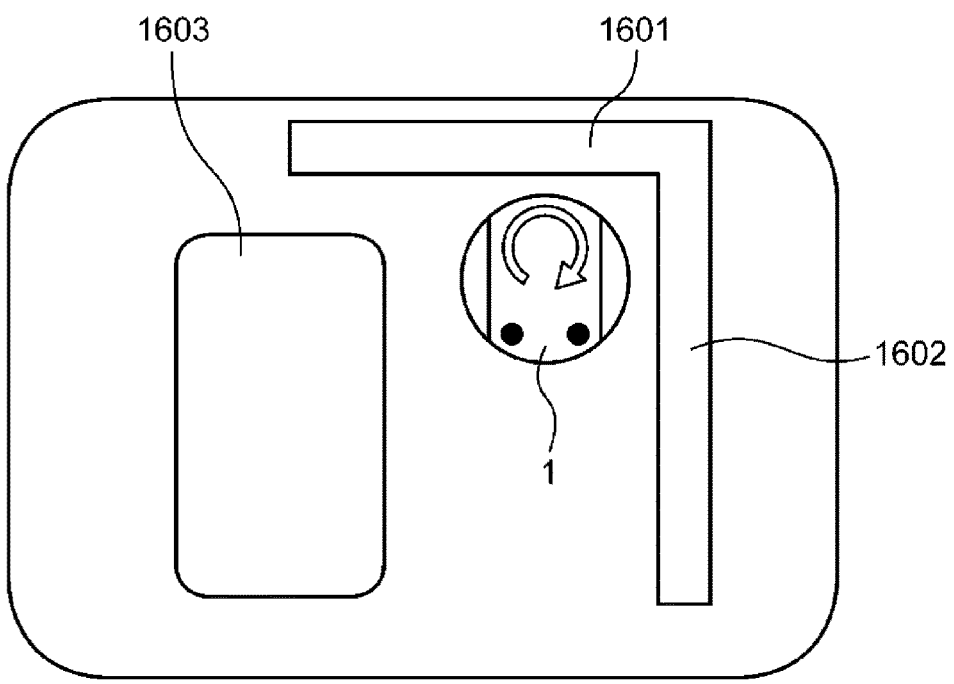
FIG. 19 illustrates a robot making a turn according to an embodiment of the present disclosure turns.

FIG. 19 illustrates a scene in which the robot 1 is making a turn according to the embodiment of the present disclosure. Note that the scene illustrated in FIG. 19 is the same as in FIGS. 16 to 18, and the robot 1 is making a turn in an area near a wall. As illustrated in FIG. 19, the robot 1 has the pivot turn function using a turning radius smaller than in a normal turn. Therefore, the robot 1 can pass around the walls 1601 and 1602 without colliding with the walls 1601 and 1602 by making a pivot turn in the area near the walls. As a result, the robot 1 can turn so as to face a direction that is 180 degrees rotated from the direction toward the wall 1601 and, thus, the robot 1 can continue to travel.

A specific example of the operation performed by the robot 1 is described below with reference to a flowchart illustrated in FIG. 14. If the distance from the robot 1 to the front wall is greater than or equal to the threshold value TH2 (NO in S202), the robot 1 travels in a zigzag line at the first speed (S208 to S210). Thereafter, if the distance from the robot 1 to the wall becomes less than the threshold value TH2 (YES in S202 and NO in S203), the robot 1 makes a normal turn to the right at the second speed (S205 to S207). At this time, when a wall is not present on the near right side of the robot 1 and if the robot 1 continues to make a normal turn to the right, the distance from the robot 1 to the object in front eventually becomes greater than or equal to the threshold value TH2 (NO in S202). Accordingly, the robot 1 resumes traveling in the zigzag line at the first speed (S208 to S210).

However, when the robot 1 makes a normal turn in the area near a wall where the walls 1601 and 1602 are located in front and on the right and left sides of the robot 1 (refer to FIGS. 16 to 19) and if the robot 1 continues to make a normal turn to the right (S205 to S207), the wall 1602 eventually appears in the front vicinity of the robot 1. If the distance from the robot 1 to the wall 1602 is less than the threshold value TH1 (YES in S203), the robot 1 starts a pivot turn process (S204).

If, after the pivot turn process in S204 is repeated, the wall 1602 disappears in the front vicinity of the robot 1, the distance from the robot 1 to the object becomes greater than or equal to the threshold value TH2 (NO in S202). Thereafter, the robot 1 resumes travelling in a zigzag line at the first speed (S208 to S210).

As described above, according to the present embodiment, if the distance from the robot 1 to the object in front is less than the threshold value TH1, the pivot turn process is performed. In the pivot turn process, after the robot 1 stops moving forward and backward, the robot 1 moves forward with the weight 114 tilted to the right around the weight shafts 123a and 124a. When the forward movement of the robot 1 is started, the forward and backward movement of the robot 1 is stopped. Thereafter, the robot 1 is moved backward with the weight 114 tilted to the left around the weight shafts 123a and 124a. In this way, according to the present aspect, the robot can be turned through a set of a forward turn to the right and a backward turn to the left and, thus, the robot can be turned with a turning radius that is smaller than in a normal turn. As a result, according to the present aspect, the robot 1 can be turned at a place where the turning space is limited, such as an area near a wall.

The following modifications can be made to the present disclosure.

(1) In the flowchart illustrated in FIG. 15, to perform a pivot turn process, the robot 1 is moved forward with the weight 114 tilted to the right first. Thereafter, the robot 1 is moved backward with the weight 114 tilted to the left. However, the present disclosure is not limited thereto. According to the present disclosure, the robot 1 may be moved forward with the weight 114 tilted to the left first. Thereafter, the robot 1 may be moved backward with the weight 114 tilted to the right.

(2) In the flowchart illustrated in FIG. 14, if the distance from the robot 1 to the object is greater than or equal to the threshold value TH1 (NO in S203), the robot 1 makes a normal turn to the right (S205 to S207). However, the present disclosure is not limited thereto. According to the present disclosure, the robot 1 may make a normal turn to the left.

(3) In the flowchart illustrated in FIG. 14, if the distance from the robot 1 to the object is greater than or equal to the threshold value TH2 (NO in S202), the robot 1 moves forward in a zigzag line (S208 to S210). However, the present disclosure is not limited thereto. The robot 1 may only move forward. In this case, the process in S209 is not needed.

According to the present disclosure, since the robot can turn even in a place where the turning space is limited, the robot is useful when the robot is used in a house which is an environment with many walls.

What is claimed is:

1. A robot comprising:
a first spherical cap portion;
a second spherical cap portion;
a spherical band-shaped main casing disposed between the first spherical cap portion and the second spherical cap portion, the spherical band-shaped main casing having a first flat surface to interface a flat surface of the first spherical cap portion, and a second flat surface to interface a flat surface of the second spherical cap portion;
a first shaft that joins the first spherical cap portion to the second spherical cap portion;
a display that is attached to the first shaft via an arm, and that displays at least part of a face of the robot in a forward direction;
a weight that is provided inside of the spherical band-shaped main casing and that rotates around a second shaft that is disposed perpendicular to the first shaft;
a first drive mechanism that drives a rotation of the first shaft to rotate the first spherical cap portion and the second spherical cap portion;
a second drive mechanism independent from the first drive mechanism, the second drive mechanism drives a rotation of the spherical band-shaped main casing about the first shaft to cause a linear movement of the robot, the linear movement including a movement in the forward direction and a movement in a backward direction;
a weight drive mechanism that rotates the second shaft;
a range finding sensor disposed in one of the first spherical cap portion and the second spherical cap portion to face a same direction as the display; and
a control circuit that:
determines whether a distance from the range finding sensor to an object disposed exterior to the robot is less than a first predetermined value,
if the distance is less than the first predetermined value, executes a pivot turn mode, wherein in the pivot turn mode, the control circuit causes the robot to turn with a first turning radius by controlling the second drive mechanism to stop the linear movement of the robot, controlling the weight drive mechanism to tilt the weight towards a first side that is in a direction towards one of the first spherical cap or the second spherical cap, controlling the second drive mechanism to cause a forward movement of the robot with the weight tilted to the first side, controlling the second drive mechanism to stop the forward movement of the robot, controlling the weight drive mechanism to tilt the weight to a second side different from the first side, and controlling the second drive mechanism to cause a backward movement of the robot with the weight tilted to the second side.

2. The robot according to claim 1, wherein, if the distance from the range finding sensor to the object measured by the range finding sensor is greater than or equal to the first predetermined value, the control circuit determines whether the distance is less than a second predetermined value that is greater than the first predetermined value, and
wherein if the control circuit determines that the distance is less than the second predetermined value, the control circuit causes the robot to turn with a second turning radius larger than the first turning radius by controlling the second drive mechanism to reduce a first speed at which the robot moves forward to a second speed lower than the first speed and controlling the weight drive mechanism to tilt the weight to the first side.

3. The robot according to claim 2, wherein, if the distance from the range finding sensor to the object measured by the range finding sensor is greater than or equal to the first predetermined value, the control circuit determines whether the distance is less than the second predetermined value, and
wherein, if the control circuit determines that the distance is greater than or equal to the second predetermined value, the control circuit controls the second drive mechanism to cause a forward movement of the robot at the first speed.

4. The robot according to claim 3, wherein, in moving the robot forward at the first speed, the control circuit causes the robot to travel in a zigzag line by controlling the weight drive mechanism to tilt the weight towards the first spherical cap and then towards the second spherical cap in a repeated manner.

5. The robot according to claim 1, further comprising:
a timer; and
a microphone that acquires a sound signal emanating from an environment surrounding the robot,
wherein the control circuit determines whether a voice sound emitted by a user of the robot to call the robot is included in a first sound signal acquired in a predetermined period of time after the timer starts measuring a time, and
wherein, if the control circuit determines that the voice sound is not included in the first sound signal acquired during the predetermined period of time, the control circuit executes a search mode in which the robot moves regardless of whether the control circuit has received an instruction for the robot from the user.

6. The robot according to claim 5, further comprising:
a camera that captures an image of the environment surrounding the robot; and
a loudspeaker that emits a sound signal,
wherein the camera is disposed in one of the first spherical cap portion and the second spherical cap portion,
wherein, if the control circuit determines that the voice sound emitted by the user to call the robot is included in the first sound signal acquired during the predetermined period of time, the control circuit determines whether an image of the user is included in the captured image, and wherein, if the control circuit determines that the image of the user is not included in the captured image, the control circuit executes the pivot turn mode until the camera captures additional images and the control circuit determines that the image of the user is included in at least one of the captured additional images.

7. The robot according to claim 5, wherein, after executing the search mode, the control circuit determines whether the voice sound emitted by the user of the robot to call the robot is included in a second sound signal acquired by the microphone until the predetermined period of time elapses, and wherein, if the control circuit determines that the voice sound is not included in the second sound signal, the control circuit continues to execute the search mode.

8. The robot according to claim 1, wherein the control circuit controls the second drive mechanism to stop the linear movement of the robot in accordance with a stop control amount for stopping the rotation of the spherical band-shaped main casing, controls the weight drive mechanism to tilt the weight to the first side in accordance with a first rotation control amount, controls the second drive mechanism to move the robot forward in accordance with a first acceleration control amount for rotating the spherical band-shaped main casing with the weight tilted to the first side, controls the second drive mechanism to stop the forward movement of the robot, controls the weight drive mechanism to tilt the weight to the second side in accordance with a second rotation control amount that is a control amount in a direction opposite to a direction of the first rotation control amount, and controls the second drive mechanism to move the robot backward with the weight tilted to the second side in accordance with a second acceleration control amount having a same control amount as the first acceleration control amount.

9. The robot according to claim 2, wherein the control circuit controls the second drive mechanism to move the robot forward in accordance with a deceleration control amount for moving the robot in the forward direction at the second speed and controls the weight drive mechanism to tilt the weight to the first side in accordance with a first rotation control amount.

10. The robot according to claim 3, wherein the control circuit controls the second drive mechanism to move the robot in the forward direction at the first speed in accordance with a constant-speed control amount for moving the robot in the forward direction at the first speed.

11. The robot according to claim 3, wherein the control circuit controls the weight drive mechanism to tilt the weight towards the first spherical cap and the second spherical cap respectively in accordance with a first rotation control amount and a second rotation control amount that is a control amount in a direction opposite to a direction of the first rotation control amount.

12. The robot according to claim 6, wherein, if the control circuit determines that the captured image includes the image of the user, the control circuit controls the weight drive mechanism to stop a movement of the weight at an initial position in accordance with a rotation stop control amount.

* * * * *